US008860342B2

(12) United States Patent
Krefta et al.

(10) Patent No.: US 8,860,342 B2
(45) Date of Patent: Oct. 14, 2014

(54) SYSTEM AND METHOD FOR CONTROLLING A PERMANENT MAGNET MOTOR

(75) Inventors: Mark P. Krefta, Murrysville, PA (US); Kalyan K. Sen, Monroeville, PA (US)

(73) Assignee: Curtiss-Wright Electro-Mechanical Corporation, Cheswick, PA (US)

( * ) Notice: Subject to any disclaimer, the term of this patent is extended or adjusted under 35 U.S.C. 154(b) by 481 days.

(21) Appl. No.: 13/233,055

(22) Filed: Sep. 15, 2011

(65) Prior Publication Data
US 2013/0069568 A1 Mar. 21, 2013

(51) Int. Cl.
| H02P 21/00 | (2006.01) |
| H02P 6/00 | (2006.01) |
| H02P 1/04 | (2006.01) |
| H02P 27/04 | (2006.01) |
| H02P 21/06 | (2006.01) |

(52) U.S. Cl.
CPC ............ *H02P 21/0021* (2013.01); *H02P 21/06* (2013.01)
USPC ............ 318/400.02; 318/400.01; 318/400.32; 318/400.33; 318/701; 318/802

(58) Field of Classification Search
USPC ............. 318/400.01, 400.02, 400.32, 400.33, 318/701, 802
See application file for complete search history.

(56) References Cited

U.S. PATENT DOCUMENTS

| 6,329,773 B1 | 12/2001 | Xia et al. | |
| 6,396,229 B1 | 5/2002 | Sakamoto et al. | |
| 6,462,492 B1 | 10/2002 | Sakamoto et al. | |
| 6,720,753 B2 | 4/2004 | Kikuchi et al. | |
| 6,984,948 B2 | 1/2006 | Nakata et al. | |
| 7,026,772 B2 | 4/2006 | Quirion | |
| 7,154,237 B2 * | 12/2006 | Welchko et al. | 318/400.27 |
| 7,495,404 B2 | 2/2009 | Sarlioglu et al. | |
| 7,525,269 B2 * | 4/2009 | Patel et al. | 318/432 |
| 7,554,281 B2 | 6/2009 | Satake et al. | |
| 8,076,881 B1 * | 12/2011 | Hall et al. | 318/400.2 |
| 8,339,094 B2 * | 12/2012 | Perisic et al. | 318/810 |
| 8,415,915 B2 * | 4/2013 | Sepe, Jr. | 318/687 |
| 2007/0040524 A1 | 2/2007 | Sarlioglu et al. | |
| 2008/0258662 A1 | 10/2008 | Sato | |
| 2009/0021196 A1 * | 1/2009 | Peyras et al. | 318/400.02 |
| 2009/0026988 A1 | 1/2009 | Tomigashi | |
| 2009/0146591 A1 | 6/2009 | Hwang et al. | |
| 2009/0160381 A1 | 6/2009 | Imura et al. | |
| 2009/0179602 A1 | 7/2009 | Hayashi et al. | |
| 2009/0237021 A1 | 9/2009 | Yamamoto et al. | |
| 2009/0267550 A1 | 10/2009 | Hida et al. | |
| 2010/0320953 A1 * | 12/2010 | Yeh et al. | 318/490 |
| 2011/0221365 A1 * | 9/2011 | Gallegos-Lopez | 318/400.02 |
| 2011/0221367 A1 * | 9/2011 | Perisic et al. | 318/400.02 |
| 2012/0169263 A1 * | 7/2012 | Gallegos-Lopez et al. | 318/400.29 |
| 2012/0187876 A1 * | 7/2012 | Perisic et al. | 318/400.02 |

* cited by examiner

*Primary Examiner* — Eduardo Colon Santana
*Assistant Examiner* — Gabriel Agared
(74) *Attorney, Agent, or Firm* — Reed Smith LLP

(57) ABSTRACT

A system. The system includes a processor, a first module, a second module and a third module. The first module is communicably connected to the processor and is configured for calculating a q-axis voltage component and a d-axis voltage component. The second module is communicably connected to the processor and is configured for determining a voltage angle relative to the q-axis. The third module is communicably connected to the processor and is configured for (1) comparing the determined voltage angle to a predetermined value, (2) outputting the determined voltage angle if the determined voltage angle is less than the predetermined value, and (3) outputting the predetermined value if the predetermined value is less than the determined voltage angle.

11 Claims, 19 Drawing Sheets

SYSTEM AND METHOD FOR CONTROLLING A PERMANENT MAGNET MOTOR

BACKGROUND

This application discloses an invention which is related, generally and in various embodiments, to a system and method for controlling a permanent magnet motor.

In many applications, a motor drive draws a three-phase fixed frequency alternating current from a power source and applies a three-phase variable frequency AC voltage to a portion of the motor referred to as the "stator". The motor draws a three-phase variable frequency alternating current which causes a portion of the motor referred to as the "rotor" to rotate, and the rotation of the portion of the motor produces a torque which is utilized to deliver some type of mechanical energy or work. A controller is commonly utilized with the motor drive to control the torque and speed of the motor.

In general, one goal of motor control is to provide shaft torque as required to accelerate the shaft or sustain a prescribed rotational speed. For some time, it has been realized that transform methods are very helpful in this task since they allow viewing the stator currents as components relative to the rotating rotor frame of reference where the field interactions with the permanent magnet take place and steady torque is generated. The stator phase currents are commonly transformed to the rotor frame to obtain direct and quadrature axes components (i.e., d- and q-axes components). The two components of stator current physically represent two spatially orthogonal windings rotating synchronously with the rotor and producing the same fundamental magnetic field as that of the stationary phase windings themselves.

The d-axis component of the stator phase current produces flux that adds to the main rotating field established by the rotor permanent magnet. This component of current produces no torque on the rotor at all since it is directly aligned with the flux from the permanent magnet. It does, however, enhance or reduce the main flux that links the stator coils and induces a voltage.

The q-axis component of the stator phase current interacts directly with the rotor field to produce electromagnetic torque since it is spatially located in quadrature with the main permanent rotor flux. That is, the q-axis current peaks at the same spatial location as the rotor magnetic field peaks so that a Lorentz force exists and this creates electromagnetic torque on the rotor shaft. It is this component of current that the transform methods control in order to control rotor shaft torque and speed. Thus, the transform provides a method of decomposing the stator current into independent flux and torque producing components for the electromechanical control of the synchronous motor.

Three of the more commonly utilized control methods are (1) the maximum torque per ampere control method, (2) the maximum torque per volt control method, and (3) the constant volts per hertz control method, each of which are described in more detail hereinbelow.

Regarding the maximum torque per ampere control method, this method controls motor speed and torque by maintaining the d-axis component of motor current at zero while controlling the q-axis current to a value sufficient to establish the desired shaft torque. This method provides the maximum torque per ampere since all of the applied stator current is used to create torque and no current adding to or subtracting from the main rotor flux is generated. That is, the flux from the torque producing q-axis current produces a magnetic field that is spatially orthogonal to the main rotor flux. The main objective of the maximum torque per ampere control method is to command the required amount of q-axis current that is needed to produce torque while holding the d-axis current at zero. This is analogous to driving a dc motor where slip rings are used to spatially locate the armature current where the applied magnetic field peaks. All of the applied current produces torque in this type of motor. In theory, the amount of torque can be increased indefinitely by proportionally increasing the amount of quadrature axis current. The other component of current is kept fixed at zero so there is no effect on the applied d-axis field level.

The expression for electromagnetic torque from the fundamental interaction between the stator transformed current and the permanent magnet field for a three-phase motor may be expressed by the following equation:

$$T = \frac{3}{2}\frac{p}{2}[\lambda_{pm}i_q + (L_d - L_q)i_q i_d] \qquad (1)$$

where T is the motor electromagnetic torque, p is number of motor poles, $\lambda_{pm}$ is the stator flux linkage from the permanent magnet, $i_q$ is the amount of q-axis current, $i_d$ is the amount of d-axis current, $L_d$ is the motor stator d-axis inductance and $L_q$ is the motor stator q-axis inductance. It should be noted that there are two components contributing to the torque in equation (1). The first component represents the interaction of the permanent magnet field ($\lambda_{pm}$) and the stator q-axis current ($i_q$). This is the primary torque component obtained from the stator current located in the region of the main rotor flux. This component represents the fundamental electromagnetic torque generation associated with the synchronous motor. The second component is a reluctance torque arising from the difference in magnetic permeance ($L_d$–$L_q$) in the q- and d-axes flux paths. This component can be ignored for the case of the "maximum torque per amp" control since the d-axis current is driven to zero. This results in a torque in equation (1) that is exactly proportional to the q-axis current for the "maximum torque per amp" control method. It should be noted that although the d-axis current is zero for the "maximum torque per amp" control method, the d-axis flux is not zero because of the main rotor flux set up by the permanent magnet. The main rotor flux from the permanent magnet produces a flux linkage in the d-axis stator coil and is denoted by $\lambda_{pm}$.

Another variable of fundamental importance in motor control is the motor terminal voltage required to drive the q-axis current and establish the electromagnetic torque. The motor voltage can be viewed in terms of the rotor reference frame d- and q-axes quantities using the dq coupled equivalent circuit model of the motor taken from equation (1) and shown in FIG. 1. The motor voltage equations are obtained from the circuits in FIG. 1 and are given in the rotor frame of reference by the following steady-state equations:

$$v_q = r_s i_q + \omega_r \lambda_{pm} + \omega_r L_d i_d \qquad (2)$$

$$v_d = r_s i_d - \omega_r L_q i_q \qquad (3)$$

The currents and voltages are driven to dc quantities in the rotor frame of reference such that a steady torque is obtained. Consequently, since the steady-state behavior of the voltage equations is the primary concern, any voltage drops associated with the inductances in FIG. 1 can be ignored. The q-axis voltage equation contains a resistive voltage drop component that is proportional to the q-axis current. The product of the speed ($\omega_r$) and the permanent magnet flux linkage ($\lambda_{pm}$) represent the back emf in the motor q-axis circuit. There exists another voltage term proportional to speed and the current of the d-axis circuit. This cross-coupling speed voltage from the d circuit is a consequence of writing the voltage equations in the transformed variables. Likewise, a speed voltage component exists in the d-axis voltage equation where the voltage component is proportional to the speed times the q-axis current.

The general relationship between d-axis flux linkage and current is given by the following equation:

$$\lambda_d = \lambda_{pm} + L_d i_d \tag{4}$$

In the case of the q-axis, there is no flux linked from a rotor source. The permanent magnet only excites the d-axis flux so that the q-axis flux linkage is simply the product of the q-axis current and inductance as given in following equation:

$$\lambda_q = L_q i_q \tag{5}$$

In the case of "maximum torque per amp" control with light loading, the q-axis current and flux linkage is small (relative to the permanent magnet flux linkage) so it may be neglected. The resulting terminal voltage is dominated by the back emf induced in the q-axis circuit (i.e., flux linkage is primarily down the d-axis). This is desirable since the only component of current is in the q-axis in the "maximum torque per amp" control because $i_d=0$. The terminal current is precisely aligned and the terminal voltage is approximately aligned with the q-axis so that they both peak at nearly the same time. This implies the motor power factor is nearly unity for very light loading with the "maximum torque per amp" control.

As the shaft loading of the motor increases, the current, $i_q$, and the corresponding flux linkage, $\lambda_q$ (=$L_q\, i_q$), increases as shown in FIG. 2. This flux linkage component is in quadrature with d-axis flux linkage ($\lambda_{pm}$) and the resultant flux linkage ($\lambda$) begins to increase. Additionally, a negative d-axis component of the speed voltage arises from the q-axis flux linkage so that the net terminal voltage contains both positive q- and negative d-axis components. The power factor angle at the motor terminals begins to increase as the shaft loading increases (i.e., voltage angle leads current angle). Eventually the shaft loading is great enough so the q-axis flux and corresponding negative d-axis speed voltage will become larger than the motor back emf from the permanent magnet itself. At this point the motor operates at a high flux level and a low power factor.

With the maximum torque per amp control method, the stator flux linkage is increased by approximately 40 percent at the point when the q-axis flux linkage is large enough to match the back emf. This increased flux level can result in magnetic saturation throughout the motor which makes the motor much less effective at high motor loading. This is in addition to operation at reduced power factor. It is clear that flux regulation at high motor loading can provide benefits to motor performance.

Regarding the maximum torque per volt control method, the method provides better regulation of the flux level at high motor loading than the maximum torque per amp control method. Flux reduction can be achieved with the maximum torque per volt control method by applying armature demagnetizing current with the d-axis circuit. The objective is to reduce the stator flux linkage and voltage by directly opposing the flux from the permanent magnet. This will have very little impact on the electromagnetic torque since the torque is controlled primarily by the motor q-axis current. However, the net stator operating flux linkage level will be reduced by the demagnetizing d-axis current. The demagnetizing current will improve the power factor at high motor loading since the terminal voltage also possesses both positive q-axis and negative d-axis components so that it tends to better align with the applied current. Thus, it will be appreciated that this method utilizes a "field reduction" or "field weakening" technique to reduce the operating flux while improving the motor power factor.

The demagnetizing d-axis current is combined with the q-axis current needed to provide motor shaft torque. The method provides torque at a minimum operating flux and voltage level. This method does require knowledge of the motor d-axis current required to completely neutralize the d-axis flux from the permanent magnet. Equation 4 provides the value of d-axis current required to produce zero net d-axis flux. This is the negative of the permanent magnet flux linkage ($\lambda_{pm}$) divided by the d-axis inductance ($L_d$). The stator d-axis current is held fixed at this level regardless of the value of the q-axis current that is used to regulate torque.

The equivalent motor circuit shown in FIG. 1 becomes simplified using the "maximum torque per volt" control method. The two voltage sources in the q-axis circuit are sized to exactly cancel each other so they can be eliminated from the circuit. The resulting circuit contains no speed voltage term so that the q-axis current is simply proportional to the q-axis voltage in the steady state. This simplifies the control since the cross coupling flux from the d-axis circuit is eliminated from consideration. However the d-axis circuit still contains the speed voltage from the q-axis flux linkage. In view of the foregoing, it will be appreciated that the maximum torque per volt control method eliminates a component of flux linkage as opposed to the maximum torque per amp control that eliminates a component of current.

Regarding the constant volts per hertz control method, the objective of this method is to keep the stator terminal volts per hertz or flux linkage at a fixed value independent of the level of motor loading. This method necessitates evaluating the level of demagnetizing d-axis current so that the volt per hertz magnitude is held constant. The condition of constant volts per hertz can be obtained using the steady state voltage equations. The voltage magnitude is the resultant of the q- and d-components given by equations (2) and (3). This control will adjust the d-axis current level such that the resultant voltage normalized by synchronous speed will be kept constant.

This method has the advantage that the magnetic operating point of the motor stator is more or less kept constant. Often the resistive component of voltage is neglected so only the stator flux linkage is controlled. Specifically, the resultant of the flux linkage vector given by equations (4) and (5) is controlled so that the stator flux linkage is fixed. Other variations of this method exist whereby the magnetizing component of the flux linkage is controlled rather than the total stator flux linkage. This often provides more precise control of the motor air gap magnetic operating point throughout a range of loads.

The level of the d-axis current required to hold the stator flux linkage constant is given by the following equation:

$$I_d = -\frac{\lambda_{pm}}{L_d} + \sqrt{\frac{\lambda_{pm}^2}{L_d^2} - \frac{L_q^2 I_q^2}{L_d^2}} \tag{6}$$

This result indicates that the condition of constant stator flux linkage can be maintained throughout a limited range of q-axis current. If the q-axis flux ($L_q\, I_q$) exceeds the permanent magnet flux ($\lambda_{pm}$) then there is no possible way of demagnetizing the magnet so that the resultant flux magnitude is held constant. This is because the q-axis flux has become so large that the resultant vector will increase in magnitude even if complete cancellation of the flux in the d-axis exists. The flux linkage can be held constant until the point when the demagnetizing current reaches its limiting value and the net d-axis flux is driven to zero. An alternative control must be pursued if greater motor loading is desired. Often this control is simply just continuing to minimize the flux increase by retaining the d-axis flux component at zero.

BRIEF DESCRIPTION OF THE DRAWINGS

Various embodiments of the invention are described herein in by way of example in conjunction with the following figures, wherein like reference characters designate the same or similar elements.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

As described in more detail hereinbelow, aspects of the invention may be implemented by a computing device and/or a computer program stored on a computer-readable medium. The computer-readable medium may comprise a disk, a device, and/or a propagated signal.

Figure 1:
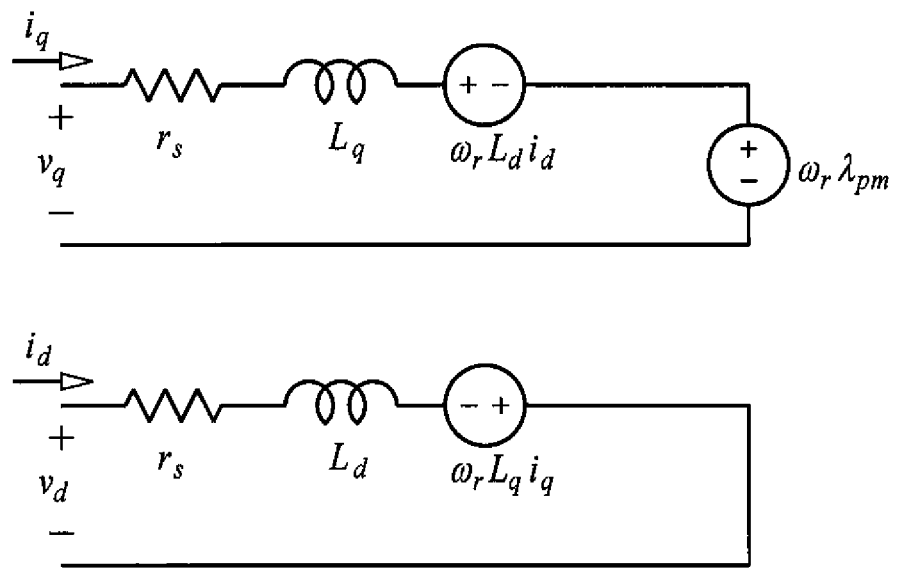
FIG. 1 illustrates equivalent d and q circuits of a permanent magnet motor viewed from the rotor frame of reference.
Figure 2:
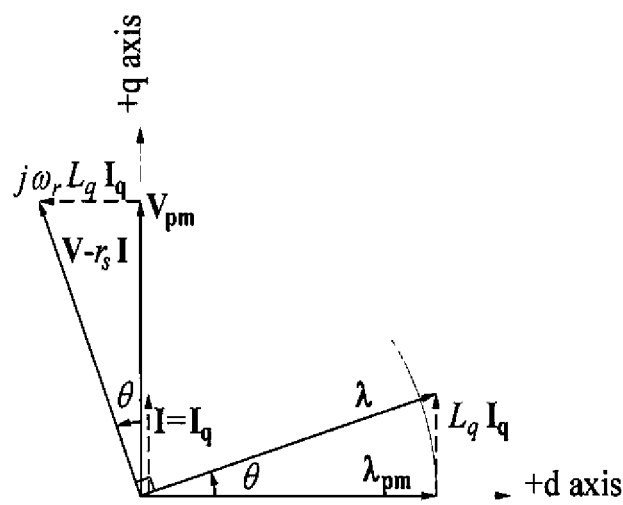
FIG. 2 illustrates a phasor diagram showing the relationship between terminal voltage, back emf, motor current and flux linkages for the maximum torque per amp control method.
Figure 3:
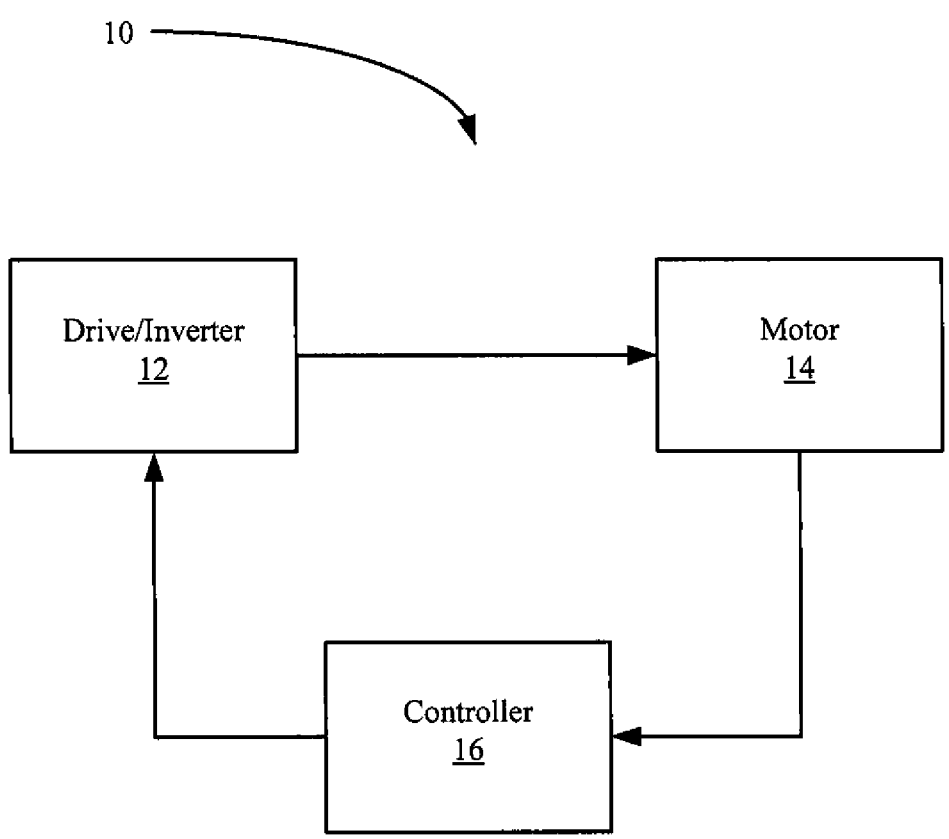
FIG. 3 illustrates a high-level representation of a system.

FIG. 3 illustrates a high-level representation of a system 10. The system 10 includes a motor drive/inverter 12, a motor 14 and a controller 16. The controller 16 may be implemented in any suitable manner. For example, according to various embodiments, the controller 16 may be implemented as one or more modules in hardware, firmware, software and combinations thereof. According to various embodiments, the controller 16 may be implemented by a computing system having one or more processors, and each of the modules are communicably connected to the one or more processors.

For embodiments utilizing software, the software may utilize any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The functionalities of the controller 16 may be stored on a computer-readable medium (e.g., disk, device, and/or propagated signal) such that when a computer reads the medium, the functions described herein are performed. According to various embodiments, the functionality of the controller 16 may be combined into fewer modules, distributed differently amongst the modules, spread over additional modules, etc. For embodiments where the computing system includes more than one computing device, the functionality of the controller 16 may be distributed amongst a plurality of the computing devices.

Figure 4:
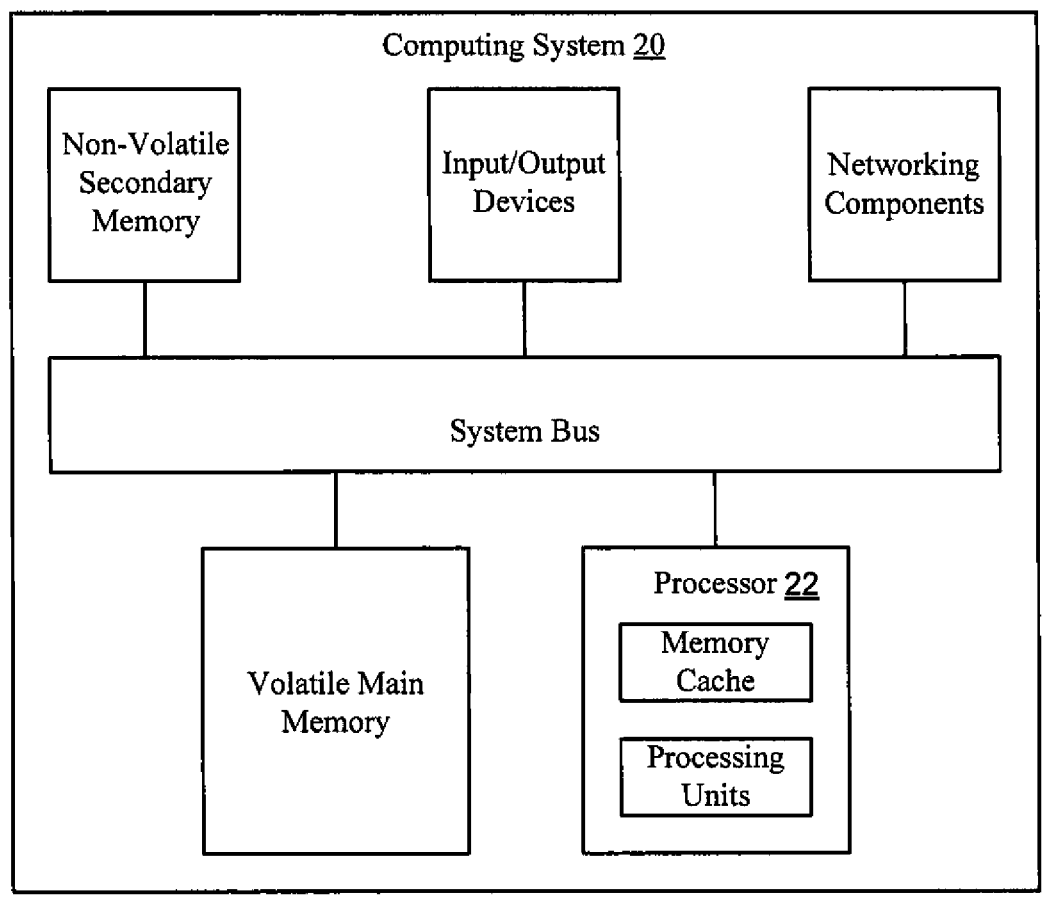
FIG. 4 illustrates various embodiments of a controller of the system of FIG. 3.

FIG. 4 illustrates a computing system 20 which implements the functionality of the controller 16 according to various embodiments. The computing system 20 may be embodied as one or more computing devices, and includes networking components such as Ethernet adapters, non-volatile secondary memory such as magnetic disks, input/output devices such as keyboards and visual displays, volatile main memory, and a processor 22. Each of these components may be communicably connected via a common system bus. The processor 22 includes processing units and on-chip storage devices such as memory caches.

According to various embodiments, the computing system 20 includes one or more modules which are implemented in software, and the software is stored in non-volatile memory devices while not in use. When the software is needed, the software is loaded into volatile main memory. After the software is loaded into volatile main memory, the processor 22 reads software instructions from volatile main memory and performs useful operations by executing sequences of the software instructions on data which is read into the processor 22 from volatile main memory. Upon completion of the useful operations, the processor 22 writes certain data results to volatile main memory.

As described in more detail hereinbelow, the controller 16 is configured to implement a combination of a unity power factor control method and a maximum power flow control method.

Regarding the unity power factor control method, the method drives the motor at a minimum volt-amp product while achieving the required shaft torque. This method operates to control the q-axis current proportional to torque and to control the d-axis current such that the motor power factor is unity. This results in minimum volt-ampere motor operation. However, as the motor shaft loading becomes large, the power can no longer be delivered using the same motor at unity power factor. The unity power factor operation must then be compromised to operate the motor at higher power loadings by limiting the motor current angle at an operating point beyond the critical current level Imax.

A unity power factor can be achieved at light to moderate loads by applying enough demagnetizing d-axis current so that the net angle of the phase current is altered to match the terminal voltage angle. The tangent of the voltage angle can be evaluated by taking the ratio of the d- to q-axis voltage as shown in the following equation:

$$\tan\theta = \frac{\omega_r L_q I_q - r_s I_d}{\omega_r L_d I_d + \omega_r \lambda_{pm} + r_s I_q} = \frac{-I_d}{I_q} \quad (7)$$

Figure 5:
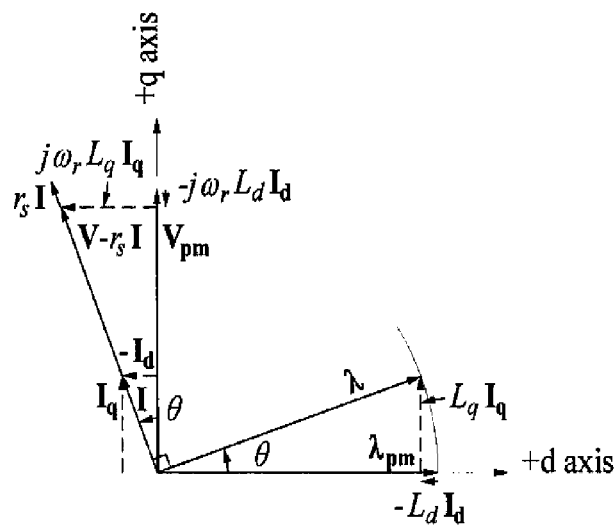
FIG. 5 illustrates a phasor diagram showing the relationship between terminal voltage and current for the unity power factor control method.

The phasor diagram relating the voltage and current is shown in FIG. 5 for the permanent magnet motor. The angle θ is defined as the voltage and current angle relative to the q-axis. The d-to-q voltage ratio is equated with the d-to-q current ratio to satisfy the unity power factor condition that the current and voltage are in phase. The level of the d-axis current to establish this condition is given in the following equation:

$$I_d = -\frac{\lambda_{pm}}{2L_d} + \sqrt{\frac{\lambda_{pm}^2}{4L_d^2} - \frac{L_q I_q^2}{L_d}} \quad (8)$$

Thus, it will be appreciated that if the d-axis current is set to the value obtained using the $I_d$ formula in equation (8) then the power angle between the current and voltage will be identically zero.

As indicated in equation (8), there can be no solution for large values of $I_q$ since the square root argument becomes negative. The maximum value of $I_q$ that will allow unity power factor operation is $I_{max}=\lambda_{pm}/(2\sqrt{L_d L_q})$. The unity power factor method works well for values of load current $I_q$ less than the critical load current $I_{max}$. When the q-axis current reaches this critical load current the ratio of d-to-q current can be shown to be $I_d/I_q=\sqrt{L_q/L_d}$. This ratio is close to unity for many permanent magnet machines. Using this approximation, according to various embodiments, the angle of the current that provides unity power factor at the largest possible load current is 45°. Of course, it will be appreciated that the angle can be other than 45° for instances where $L_q$ is not equal to $L_d$. Load currents greater than the critical load current are not able to be effectively supported at unity power factor.

Figure 6:
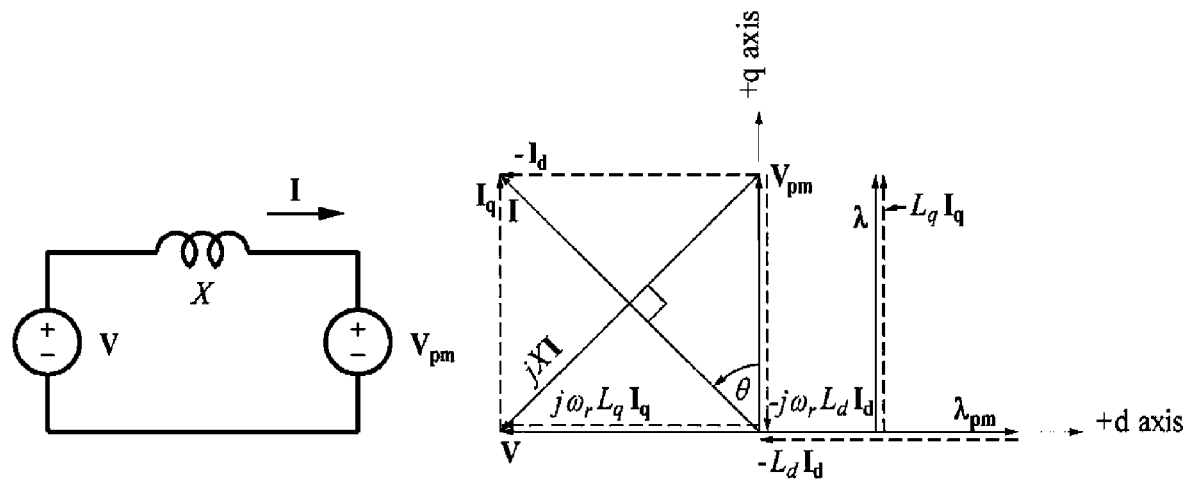
FIG. 6 illustrates a phasor diagram showing the relationship between terminal voltage and current for the maximum power flow control method.

The "unity power factor" control is effective at low to moderate current loading. The control must also accommodate high level motor loading near pullout in addition to the lighter loading cases. One approach geared towards handling the high level motor loading is the "maximum power flow" control. The "maximum power flow" control is based on the fact that the maximum power transfer occurs when the angle between the terminal and back emf voltages is 90° out of phase as illustrated in FIG. 6 and the following equation:

$$P = \frac{VV_{pm}}{X}\sin(90°) \quad (9)$$

The resulting current angle is perpendicular to the voltage difference between the terminal voltage and back emf, neglecting the stator resistance.

The requirement for "maximum power flow" dictates the current angle (θ) at 45° ahead of the motor back emf (or at an angle other than 45° for instances where $L_q$ is not equal to $L_d$) assuming equal back emf and terminal voltages. This can be implemented by controlling the q- and minus d-axis current components to be equal for this control method. As the phase current magnitude is increased, the terminal voltage will eventually be directed down the negative d-axis resulting in maximum power flow to the motor shaft. The precise value of the current angle will affect the terminal voltage magnitude and therefore peak torque the motor is able to supply. If the motor terminal voltage required to supply peak torque is significantly greater than the back emf, the precise current angle (θ) can be determined from the following equation:

$$\tan\theta = \frac{V}{V_{pm}} = \frac{-I_d}{I_q} \quad (10)$$

by using $\tan^{-1}$ (V/V$_{pm}$) instead of 45°. For embodiments utilizing the 45° approximation, the 45° operating angle simplifies the implementation of the control since the minus d-axis current is set equal to the q-axis current and no motor parameters are needed in the control.

The fundamental approach associated with the maximum power flow control is to force the relative phase angle between the back EMF and terminal voltage to be 90 degrees. This is approximately obtained by setting the d- and q-components of the motor current to be equal. However as the loading is increased to the point where $I_d$ has fully demagnetized the permanent magnet (i.e., $I_d=-\lambda_{pm}/L_d$), then it no longer is advantageous to further increase $I_d$. The value of $I_d$ is limited to this level and only $I_q$ is increased if further torque loading is requested. This limitation of the d-axis current serves two purposes. First, it protects the permanent magnet from demagnetization as a result of the large demagnetizing fields from the armature currents. Secondly, limiting $I_d$ to $-\lambda_{pm}/L_d$ does precisely correspond to maximum power flow because the terminal voltage is thereby directed down the negative d-axis as a result of the flux being directed purely down the positive q-axis. Since the terminal voltage (negative d-axis directed) leads the back EMF (positive q-axis directed) by exactly 90 degrees, the maximum power flow situation is guaranteed.

According to various embodiments, the "maximum power flow" control can be used on its own throughout the entire range of operation. According to other embodiments, the maximum power flow control can be utilized in combination with the "unity power factor" control. For example, the unity power factor control can be utilized until the current becomes larger than that the "unity power factor" control can support, then the maximum power flow control can be utilized thereafter. According to various embodiments, by monitoring the voltage angle, the unity power factor control can be utilized for light to moderate loaded cases when the voltage angle is less than 45° (or at an angle other than 45° for instances where $L_q$ is not equal to $L_d$). When the voltage angle exceeds 45° (or at an angle other than 45° for instances where $L_q$ is not equal to $L_d$), the maximum power flow control can be utilized. The voltage angle can be evaluated on an instantaneous basis, and by setting the d-axis current according to the following equation, the current angle can be matched to the voltage angle:

$$I_d = -I_q \tan\theta \quad (11)$$

When the voltage angle becomes excessive (e.g., exceeds 45°), the d-axis current can alternatively be assigned to match the negative of the q-axis current. That is, the current is aligned at a 45° angle (or at an angle other than 45° for instances where $L_q$ is not equal to $L_d$) relative to the back emf. This control method provides a smooth and convenient transition from unity power factor control at light load to maximum power flow control at high load. When the power loading has increased to the point that d-axis current has completely neutralized the permanent magnet flux then the d-axis current is no longer increased. This corresponds to very heavy loading of the motor and protection from large demagnetizing fields is desirable. Maximum power flow control is fully active at this point so the maximum amount of mechanical power is being delivered to the rotor for a given terminal voltage.

Modern motor controls use various types of inverters (e.g., motor drive/inverter 12) to control the motor speed and torque performance. Inverter ratings are based on volt-ampere product $V_{pk}I_{pk}$. To obtain the optimum utilization of a motor drive it is necessary to match the $V_{pk}I_{pk}$ product of the motor and the inverter. This can be achieved by applying the unity power factor control method at low to moderate motor loading and the "maximum power flow control method at high motor loading.

Figure 7:
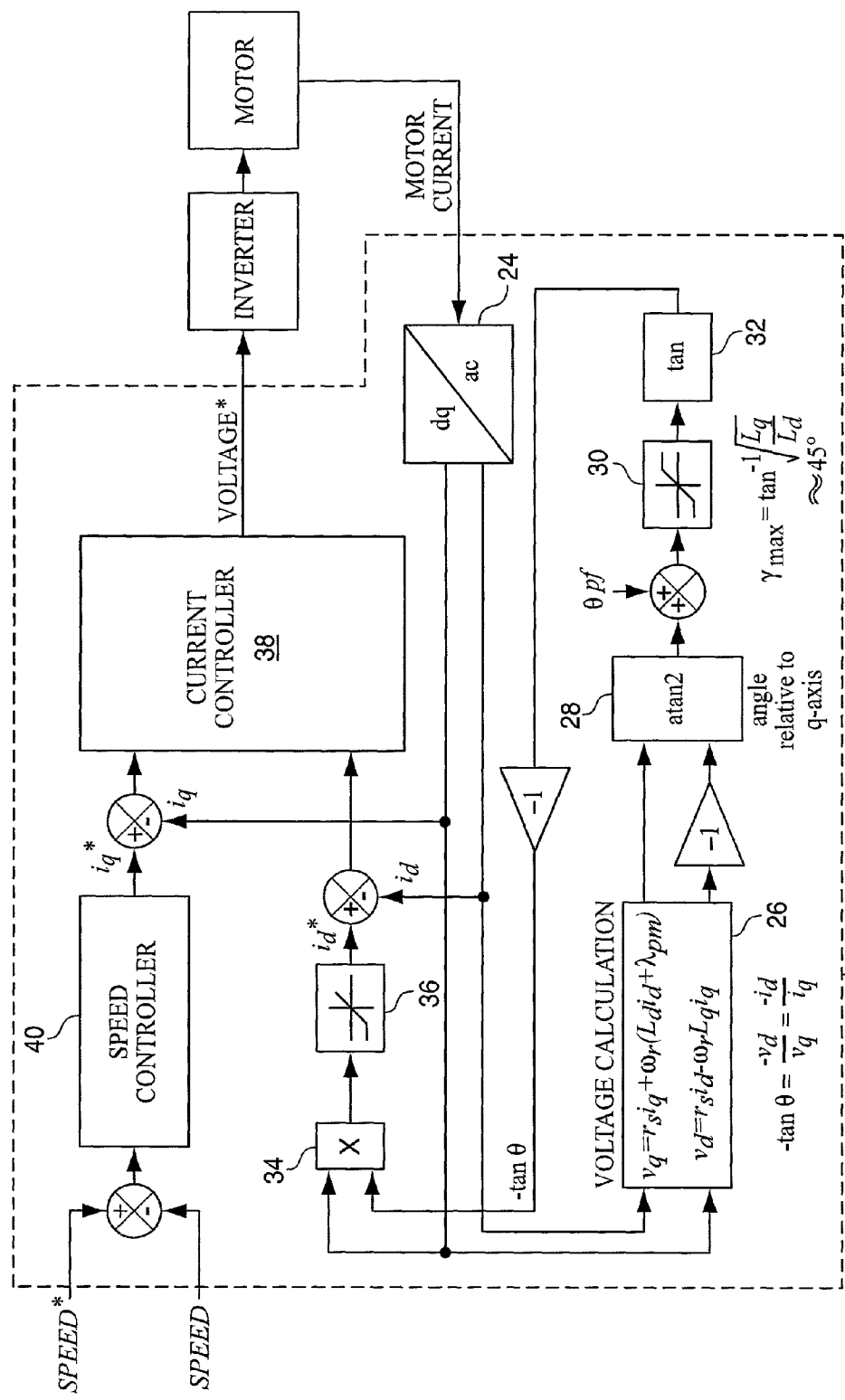
FIG. 7 illustrates various embodiments of the controller of the system of FIG. 3.

FIG. 7 illustrates various embodiments of the controller 16 of FIG. 3. As shown in the middle right hand side of FIG. 7, the measured AC motor currents are input to the controller 16, and a transformation module 24 transforms at least two phases of the measured AC motor currents into the d-axis ($i_d$) and q-axis ($i_q$) current components.

The d-axis ($i_d$) and q-axis ($i_q$) current components are input to a voltage calculation module 26 which calculates the q-axis voltage ($v_q$) and the d-axis voltage ($v_d$) using equations (2) and (3). The calculated q-axis voltage ($v_q$) and a negative of the calculated d-axis voltage ($v_d$) are input into an angle determination module 28 which determines the voltage angle relative to the q-axis. Based on the fact that the ratio of the steady state negative d-axis voltage to the steady state q-axis voltage defines the tangent of the voltage angle, the angle determination module 28 can determine the voltage angle by solving for the arc tangent of the ratio. Since it is desired to set the current angle equal to the voltage angle for unity power factor operation, the controller 16 uses the voltage angle as the current angle reference.

According to various embodiments, the determined voltage angle, which is used as the current reference angle, is input into a limiter module 30. According to other embodiments, a value for the power factor angle ($\theta_{pf}$) may be added to the determined voltage angle before the determined angle is input into the limiter module 30. This allows for operating the controller 16 at a fixed power factor other than unity. The limiter module 30 operates to limit the current angle which is output by the limiter module 30 to a predetermined value. The predetermined value of the current angle may be any suitable value. For example, according to various embodiments, the predetermined value is set to the arc tangent of the square root of the ratio $L_q/L_d$. According to other embodiments, the predetermined value may be set to 45°.

If the value of the current angle input into the limiter module 30 is less than the predetermined value, the output of the limiter module 30 is the same as the input. However, if the value of the current angle input to the limiter module 30 is greater than the predetermined value, the output of the limiter module 30 is the predetermined value. Thus, it will be appreciated that the limiter module 30 compares its input to the predetermined value and outputs (1) the input value if the input value is less than the predetermined value or (2) the predetermined value if the input value is greater than the predetermined value. As described in more detail hereinbelow, the utilization of the limiter module 30 allows for a smooth transition from the constant power factor control (used when the current angle is less than the predetermined value) to the maximum power transfer control (used when the current angle is greater than the predetermined value).

The output of the limiter module 30 is input into a tangent module 32 which generates a value for the tangent of its input (i.e., the output of the limiter module 30). A negative of this value, and a value of the q-axis current ($i_q$), is input into a multiplier module 34 which generates and outputs a d-axis current reference value ($i_d^*$). The d-axis current reference value is limited by limiter module 36 to ensure excessive demagnetization does not occur. Limiter module 36 further locks in maximum power flow operation for the highest motor electrical loadings that will be supplied by the inverter drive 12. The controller 16 compares the d-axis reference current value ($i_d^*$) with the d-axis current ($i_d$) to determine a d-axis current error which is input into a current controller 38.

As shown in the upper left hand corner of FIG. 7, the controller 16 compares a measured speed with a speed reference value (speed*) to determine a speed error which is input to a speed controller 40. The speed controller 40 utilizes the speed error to determine a q-axis current reference value ($i_q^*$). The speed controller 40 may be implemented as any suitable type of speed controller (e.g., a proportional-integral controller). The controller 16 also compares the determined q-axis current reference value ($i_q^*$) with the q-axis current ($i_q$) to determine a q-axis current error which is input to the current controller 38.

Based on the q-axis current error and d-axis current error inputs, the current controller 38 generates and outputs motor phase voltage references. The current controller 38 may be implemented as any suitable type of current controller (e.g., a proportional-integral controller). According to various embodiments, the current controller 38 first utilizes a proportional-integral control scheme to amplify the q-axis current error and the d-axis current error. The amplified error signals are then fed into an impedance matrix relating the qd currents to the qd voltages accounting for the cross coupling from the speed voltage terms. The d-axis voltage component and the q-axis voltage component are then transformed to the physical phase variables and used as reference voltages (voltage*) applied to the inverter 12.

The reference voltages are applied to the inverter 12 and motor terminal voltages are created. The phase voltages are applied to the motor 14 and the phase currents are measured. The phase currents are transformed to q- and d-axis variables in the synchronous reference frame to obtain the measured current components. The measured qd current components, in turn, are used to form the current error and voltage angle evaluation relative to the q-axis.

Figure 8:
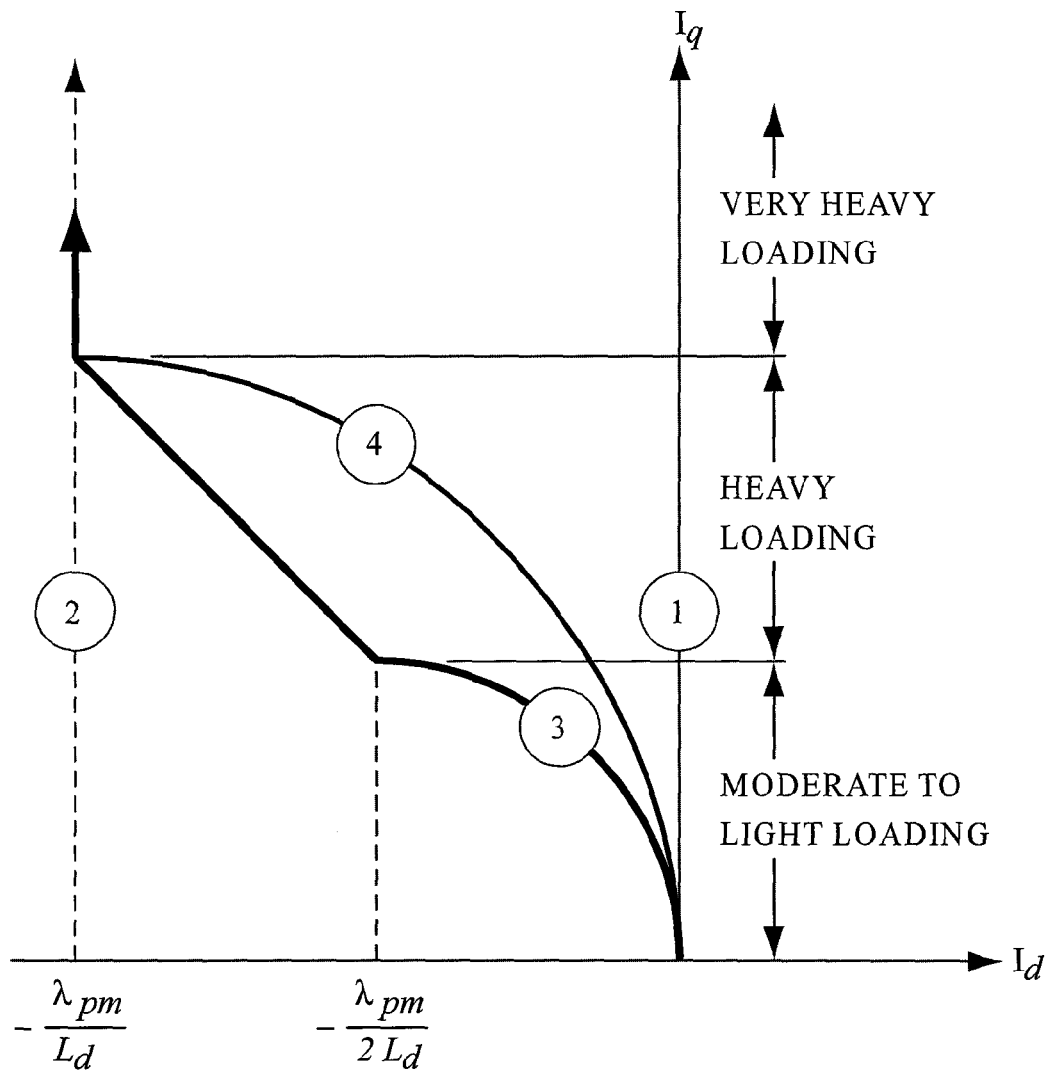
FIG. 8 illustrates five current trajectories associated with different control methods.

FIG. 8 illustrates five different current trajectories associated with the control methods described hereinabove, namely the maximum torque per amp control, the maximum torque per volt control, the constant volts per hertz control, the unity power factor control, and the combination of the unity power factor control/maximum power flow control. For the maximum torque per amp control (labeled 1 in FIG. 8), the trajectory runs vertically up the $I_q$ axis as the torque loading increases. For the maximum torque per volt control (labeled 2 in FIG. 8), the d-axis demagnetizing current is fixed to cancel the permanent magnet flux. This produces a vertical current trajectory parallel to the $I_q$ axis as the load increases. For the unity power factor control (labeled 3 in FIG. 8), the trajectory is shown over the range of demagnetizing $I_d$ current between zero and enough current to generate one-half the permanent magnet flux ($\lambda_{pm}/2L_d$). Both the d- and q-axis current components increase with loading. Initially the increase is in the q-axis current with very little d-axis current. The d-axis current becomes large as the loading increases until the point is reached where unity power factor can no longer be maintained. For the constant volts per hertz control (labeled 4 in FIG. 8), the trajectory is similar to the unity power factor control. At light loading the current is primarily q-axis component and the d-axis current component increases with increasing load until a constant stator flux linkage can no longer be maintained at $\lambda_{pm}/L_d$. It will be appreciated that the trajectory for the maximum power flow control (not shown) would be an angled straight line at 45 degrees leading the q-axis until a constant value of Id is reached beyond which the d-axis current is fixed. The controller 16 combines the unity power factor and the maximum power flow control methods to provide the composite trajectory identified in bold in FIG. 8. The unity power factor control is used for light to moderate loading levels (e.g., the d-axis current is ≥zero and ≤$\lambda_{pm}/2L_d$). A transition occurs at high loading levels (e.g., the d-axis current is ≥$\lambda_{pm}/2L_d$ and ≤$\lambda_{pm}/L_d$) where the q-axis current component and a negative of the d-axis current component are set equal to each other. The very high loading (e.g., the d-axis current is ≥$\lambda_{pm}/L_d$) is performed using the maximum power flow approach where the demagnetizing current is limited.

Simulations

The overall performance of the above-described control methods can be evaluated through transient simulation of a motor scenario. Simulations have been performed comparing and contrasting the different control methods. For the simulations, the shaft was accelerated to rated speed, followed by no load steady operation at rated speed, and then the load torque was increased to maximum while holding the speed constant at rated, and finally steady operation at maximum torque and rated speed.

Figure 9:
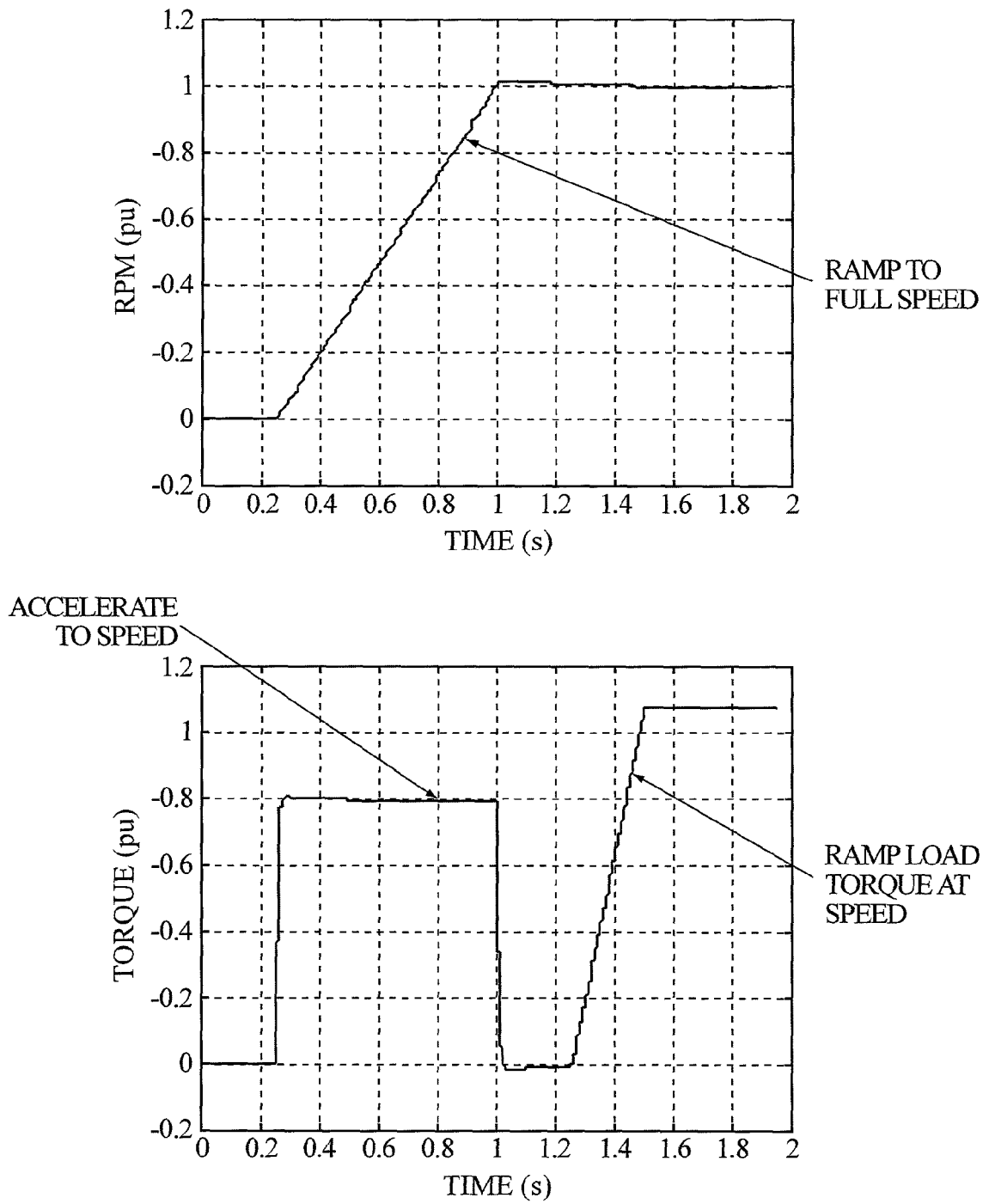
FIG. 9 illustrates a representative torque and speed scenario to be used in simulation studies.

Regarding the maximum torque per amp control method, FIG. 9 shows the simulated torque and speed profiles vs. time for this method. Note that the speed ramps up as a step in torque is commanded. The speed settles to its rated value at 1 second and then remains constant until 1.25 seconds. The load torque is then ramped at 1.25 seconds for 0.25 seconds until it reaches a maximum value at 1.5 seconds and remains constant.

Figure 10:
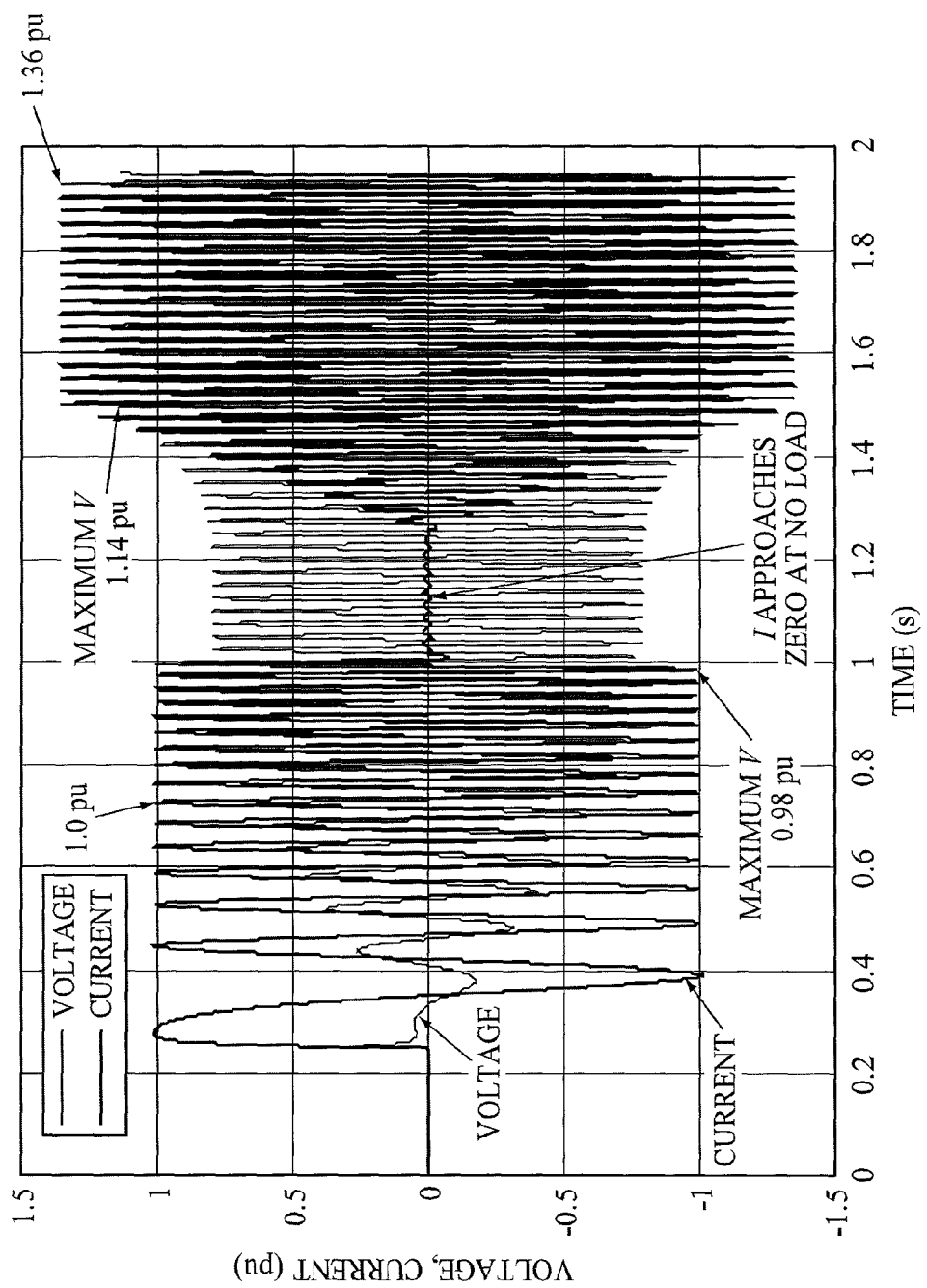
FIG. 10 illustrates simulated current and voltage waveforms for a maximum torque per amp control method.

FIG. 10 shows the applied terminal voltage and current for this control method. The voltage magnitude ramps in the interval from 0 to 1 second as the speed increases. The current remains constant in amplitude during this interval in order to establish constant shaft torque. The frequency of the waveforms increases as the rotor accelerates to speed. The current magnitude drops to near zero at 1 second since little torque is needed to sustain the rotor at constant speed. The load torque is then ramped starting at 1.25 seconds while requesting constant speed which produces a ramp in the motor current level. The voltage runs up in this interval as the flux level is increased as a result of the loading. The torque and corresponding current and voltage amplitude remain constant beyond 1.5 seconds.

Figure 11:
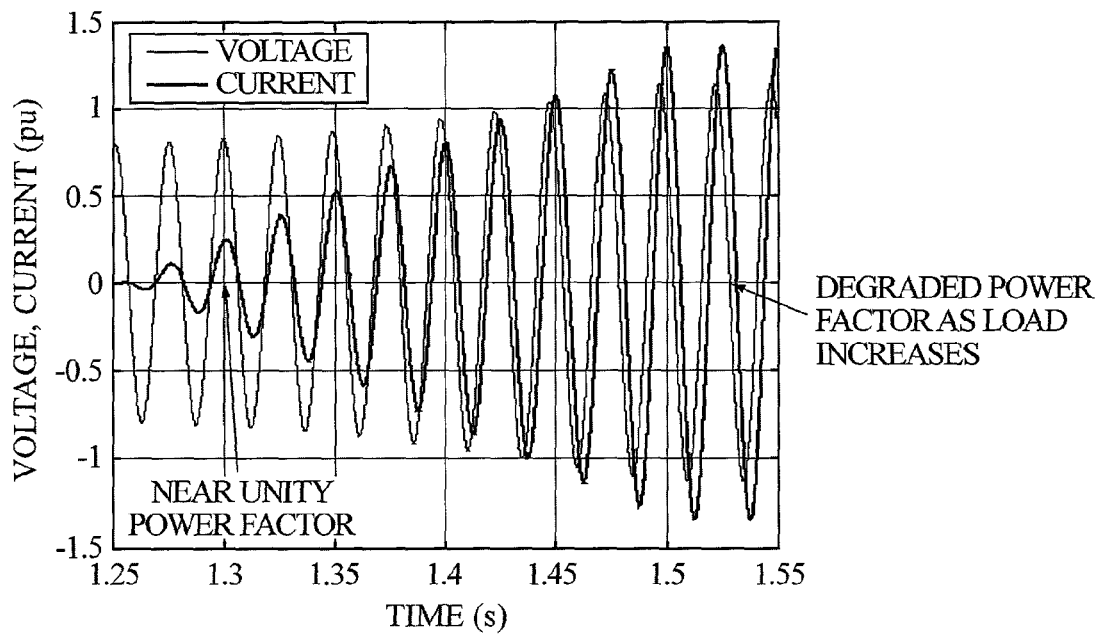
FIG. 11 illustrates simulated motor voltage and current in the torque ramp-up interval for a maximum torque per amp control method.
Figure 11:
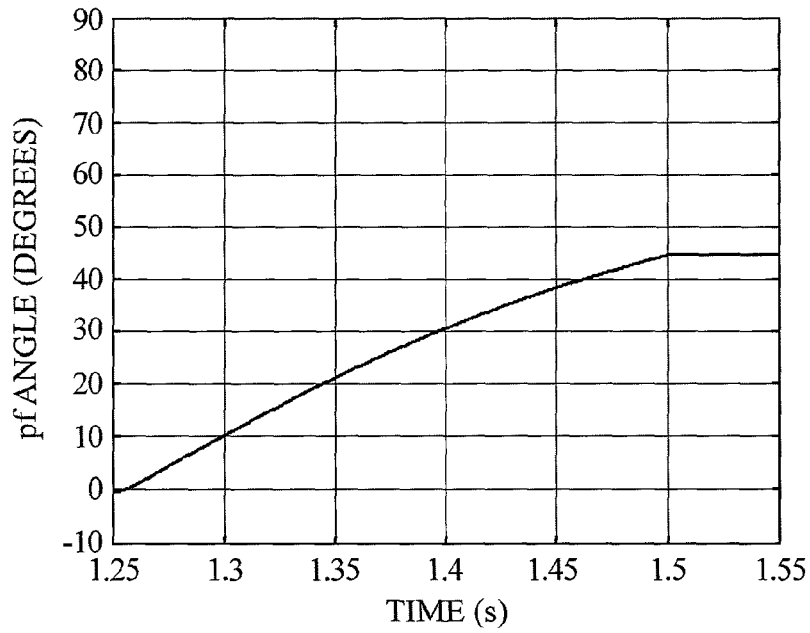

FIG. 11 shows a plot of the phase current and voltage during the torque ramp-up interval. This shows the gradual degradation of the phase relationship between the terminal voltage and current with increasing load. At light load the power factor angle is close to zero as the current and voltage are nearly in phase. However, as the load increases the current lags the voltage by increasing amounts and the power factor becomes poor at high loading. The power factor angle has increased to 45° at maximum loading.

Figure 12:
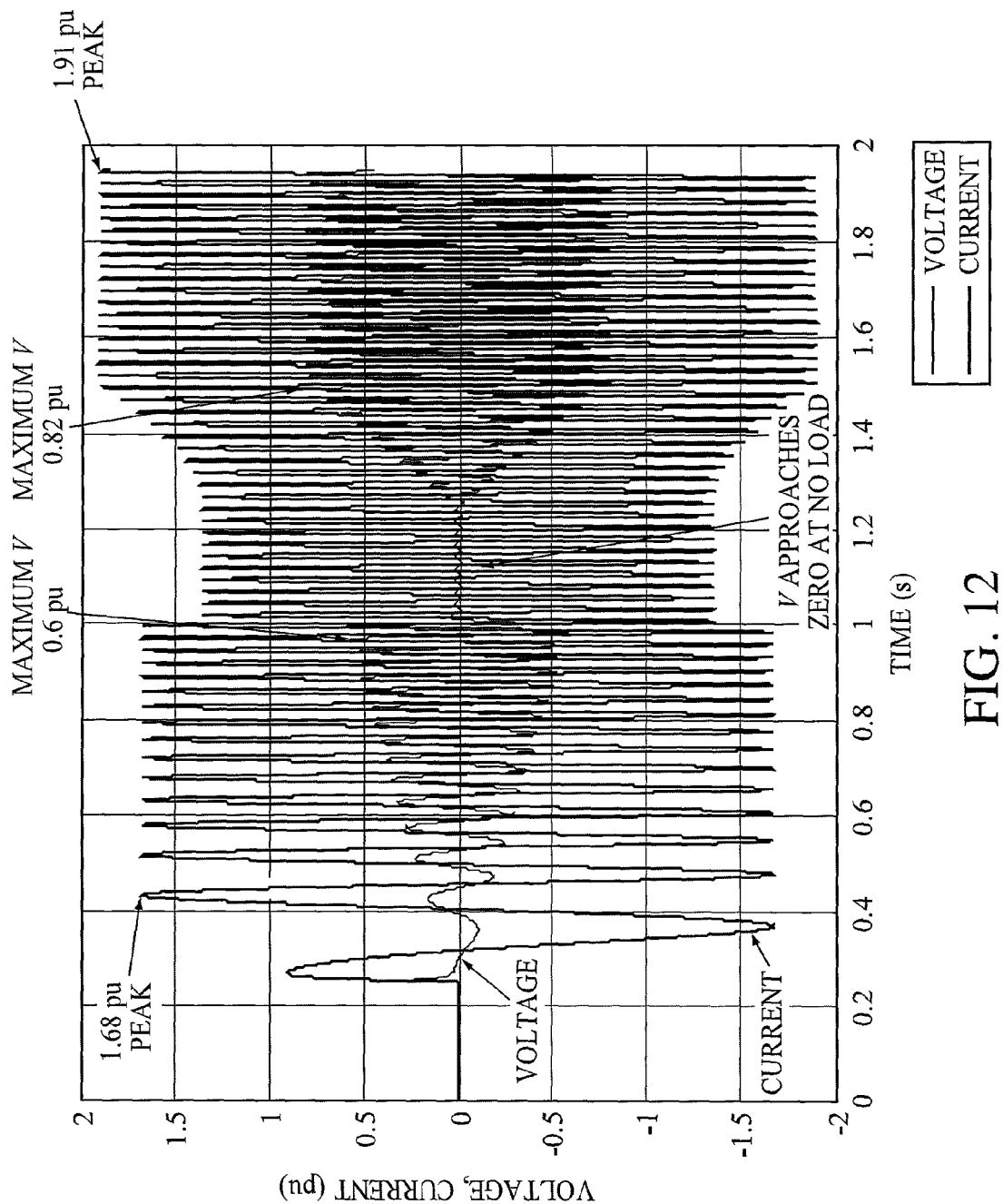
FIG. 12 illustrates simulated current and voltage waveforms for a maximum torque per volt control method.

Regarding the maximum torque per volt control method, FIG. 12 shows the voltage and current waveforms as the speed is ramped to the rated value and then the load torque is ramped at constant speed. The voltage is substantially lower than the case of maximum torque per amp control method throughout the range of the simulation. The voltage is practically zero during the no load interval at rated speed between 1 and 1.25 seconds. This is because the stator d-axis flux linkage has been driven to zero in this interval and there is no q-axis current and flux linkage at no load. Whereas the peak voltage occurring at the peak torque point using the maximum torque per amp control method was 1.14 pu, the maximum torque per volt control method reduces the peak voltage occurring at the peak torque point to 0.82 pu. This voltage reduction is obtained at the expense of significantly increased current levels. With the maximum torque per volt control method, the peak current at maximum speed and torque has increased to 1.91 pu as compared to 1.36 pu for the maximum torque per amp control method. Thus, it will be appreciated that this control approach reduces the terminal voltage at the expense of current. This control also provides better regulation of the motor current and it can be modified to form a constant current amplitude scheme where only the phase of the current is adjusted to control torque.

Figure 13:
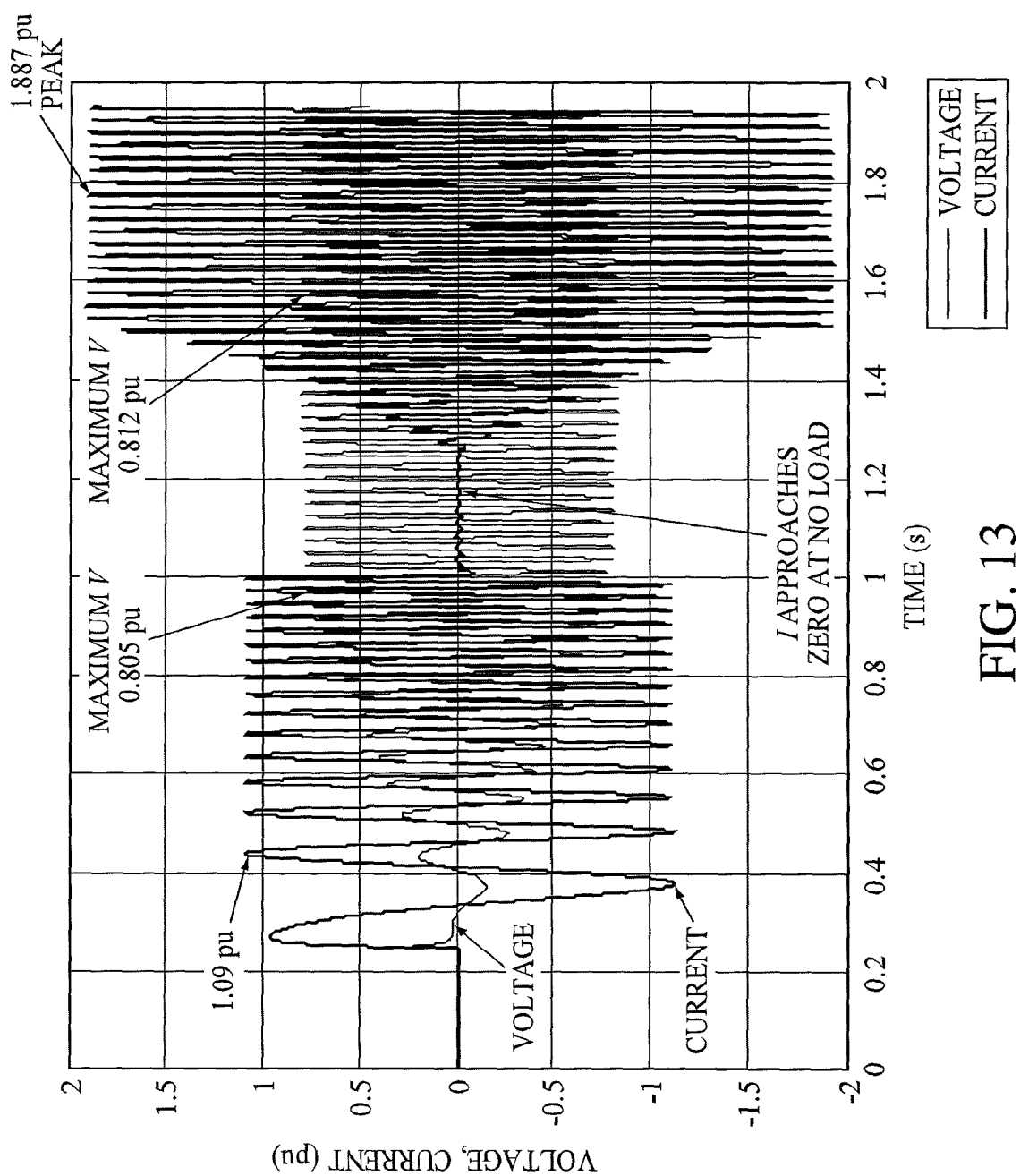
FIG. 13 illustrates simulated current and voltage waveforms for a constant volts per hertz control method.

Regarding the constant volts per hertz control method, FIG. 13 shows the voltage and current waveforms for this method. The voltage regulation is much improved after the motor obtains rated speed. This occurs because the stator flux linkage is constrained to be fixed in accordance with this method. The voltage is regulated to 0.812 pu at rated speed which is significantly less than the 1.14 pu realized with the maximum torque per amp control method but similar to the 0.82 pu associated with the maximum torque per volt control method. The peak current realized with this method at maximum speed and torque is 1.887 pu. This current is larger than the 1.36 pu realized with the with the maximum torque per amp method, and similar in size to the 1.91 pu realized with the maximum torque per volt control method. In addition to regulating the voltage, the volt-ampere product is reduced for the constant volts per hertz control method −1.53 for the constant volts per hertz control method versus 1.55 for the maximum torque per amp control method and 1.57 for the maximum torque per volt control method.

Figure 14:
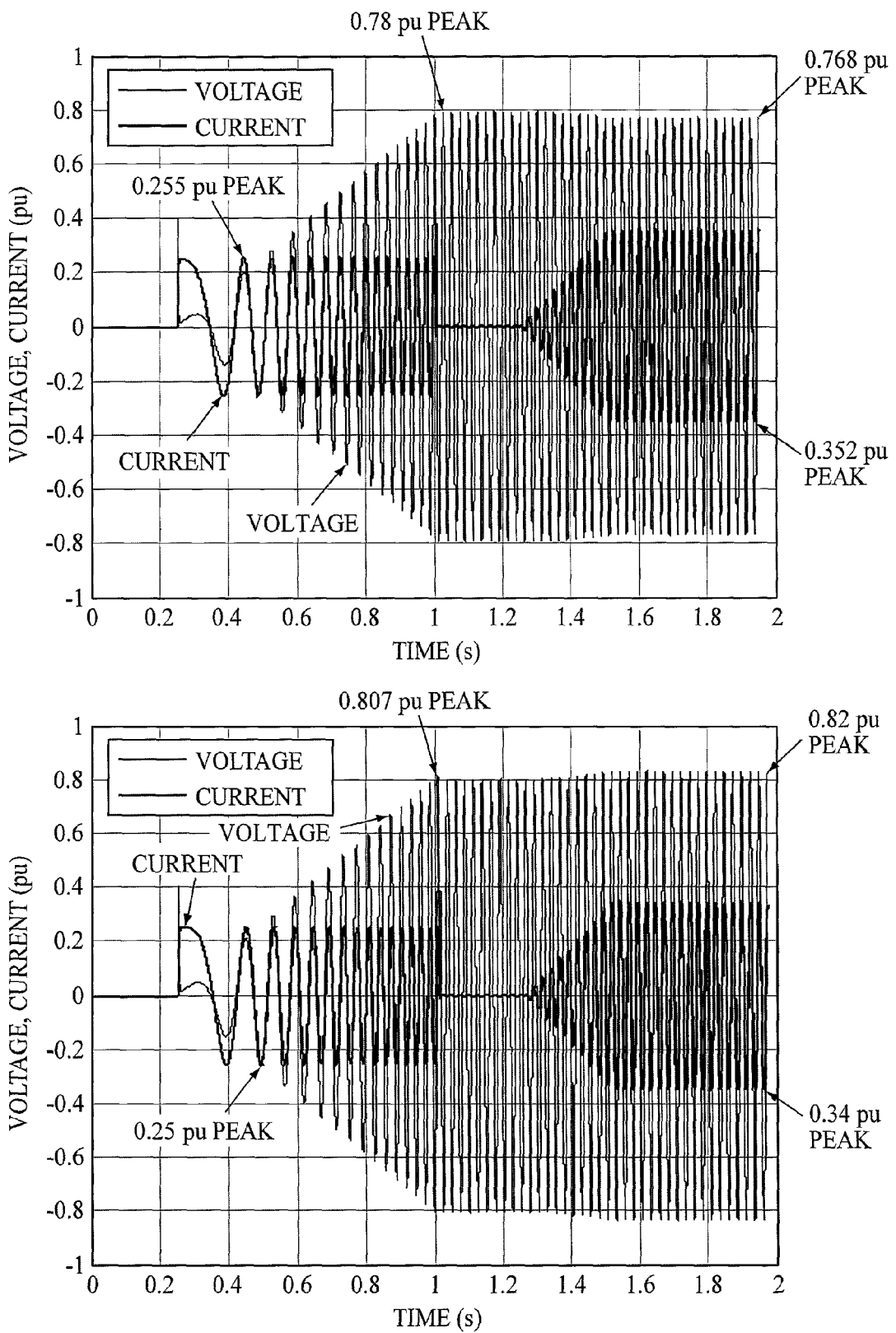
FIG. 14 illustrates a comparison between the voltages and currents associated with the unity power factor control method with those from maximum torque per amp control method for one-quarter of peak loading.
Figure 16:
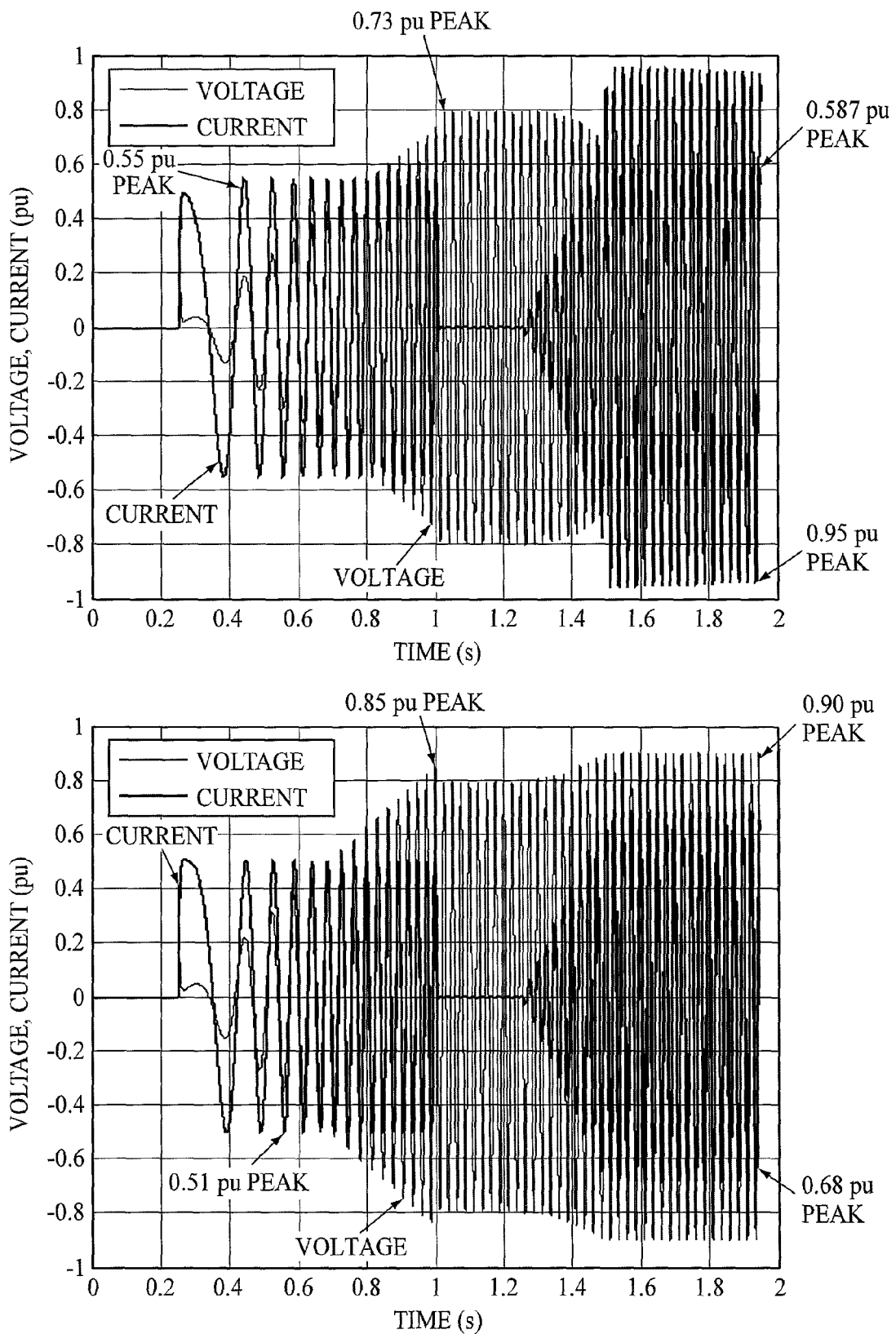
FIG. 16 illustrates a comparison between the voltages and currents associated with the unity power factor control method with those from maximum torque per amp control method for one-half of peak loading.
Figure 18:
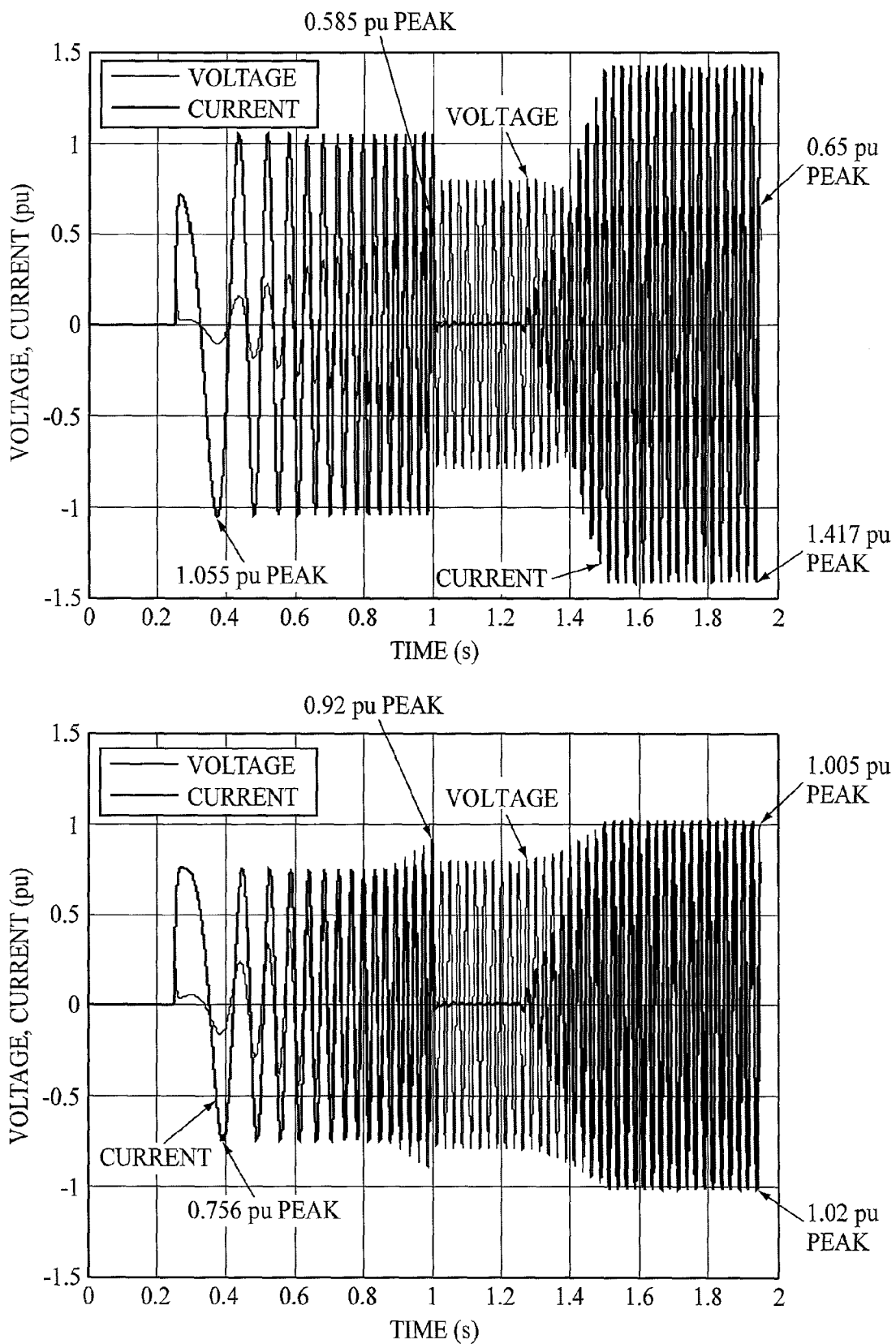
FIG. 18 illustrates a comparison between the voltages and currents associated with a combination of the unity power factor control and the maximum power flow control methods with those from maximum torque per amp control method for three-quarters of peak loading.

Regarding the unity power factor control method and the maximum power flow control method, the unity power factor control method can be incorporated with knowledge of the permanent magnet flux linkage or back emf and the d- and q-axes inductances. Simulations were performed at reduced loading levels to ensure that unity power factor operation could be achieved. FIGS. 14 and 16 compare the voltages and currents associated with the unity power factor control method with those from maximum torque per amp control method for one-quarter of peak loading and one-half of peak loading respectively, and FIG. 18 compares the voltages and currents for the combination of the unity power factor control/maximum power flow control methods with those from maximum torque per amp control method for three-quarters of peak loading. The voltages and currents for the unity power factor control method (and combination of the unity power factor control/maximum power flow control methods) are shown at the top of FIGS. 14, 16 and 18 whereas the voltages and currents for the maximum torque per amp control method are shown at the bottom of FIGS. 14, 16 and 18. The results are tabulated in Tables 1 and 2, respectively. Tables 1 and 2 also show results for the combination unity power factor/maximum power factor control methods at peak loading (See FIG. 20) and the maximum torque per amp control method at peak loading (See FIG. 10).

TABLE 1

Unity power factor/maximum power flow control

| | Voltage peak (Vpk) | Current peak (Ipk) | Vpk * Ipk |
|---|---|---|---|
| One-quarter peak loading | 0.768 | 0.352 | 0.270 |
| One-half peak loading | 0.587 | 0.95 | 0.558 |
| Three-quarters peak loading | 0.653 | 1.417 | 0.925 |
| Peak loading | 0.813 | 1.878 | 1.527 |

TABLE 2

Maximum torque per amp control

| | Voltage peak (Vpk) | Current peak (Ipk) | Vpk * Ipk |
|---|---|---|---|
| One-quarter peak loading | 0.82 | 0.34 | 0.279 |
| One-half peak loading | 0.90 | 0.68 | 0.612 |
| Three-quarters peak loading | 1.005 | 1.02 | 1.025 |
| Peak loading | 1.14 | 1.36 | 1.549 |

The volt-ampere product Vpk*Ipk is generally the important quantity for determining the rating of the inverter 12. In case of light loading, the motor 14 also operates near unity power factor for the maximum torque per amp control method. Therefore, the product Vpk*Ipk of 0.279 in the case of the maximum torque per amp control method at one-quarter of peak loading is just slightly larger than the same quantity of 0.270 in the case of the unity power factor control method. This volt-ampere product for the maximum torque per amp control method degrades as the loading increases. The product Vpk*Ipk of 0.62 in the case of maximum torque per amp control method at one-half loading is 10% higher than the same quantity of 0.557 in the case of the unity power factor control method. Further increase in the loading compromises the absolute unity power factor control method. However, a combination of the unity power factor control method and the maximum power flow control method results in a lower Vpk*Ipk than the maximum torque per amp control method.

Figure 15:
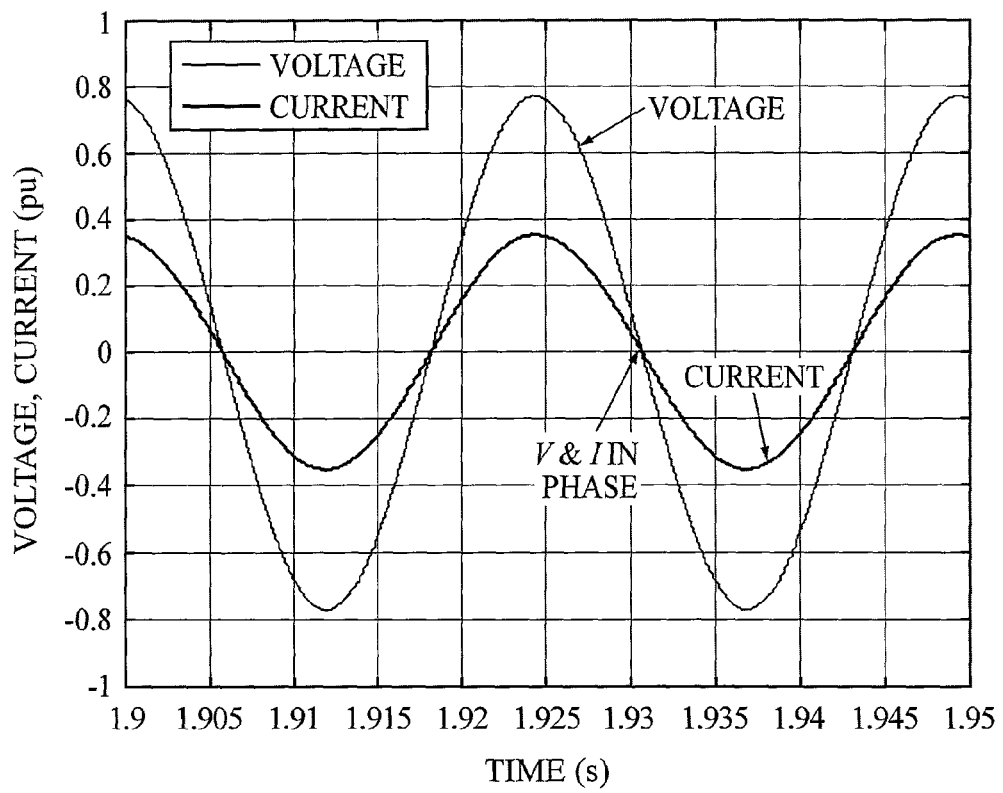
FIG. 15 illustrates the phase relationship between the voltage and current waveforms associated with the unity power factor control method and those from the maximum torque per amp control method at one-quarter of peak loading.
Figure 15:
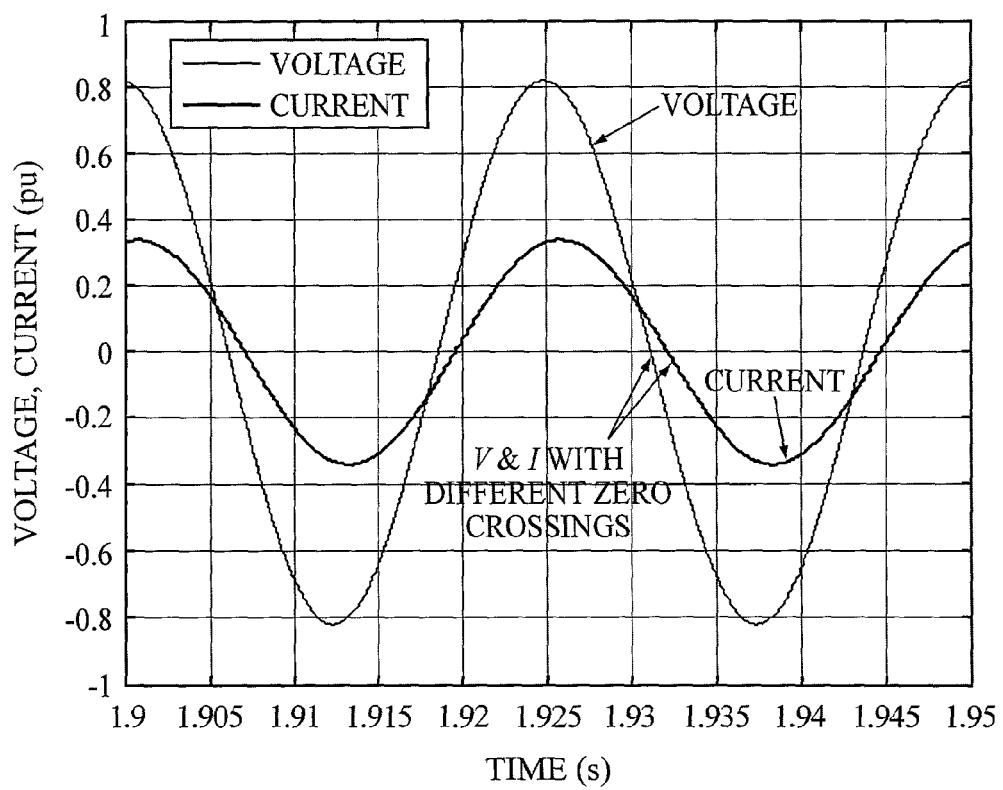
Figure 17:
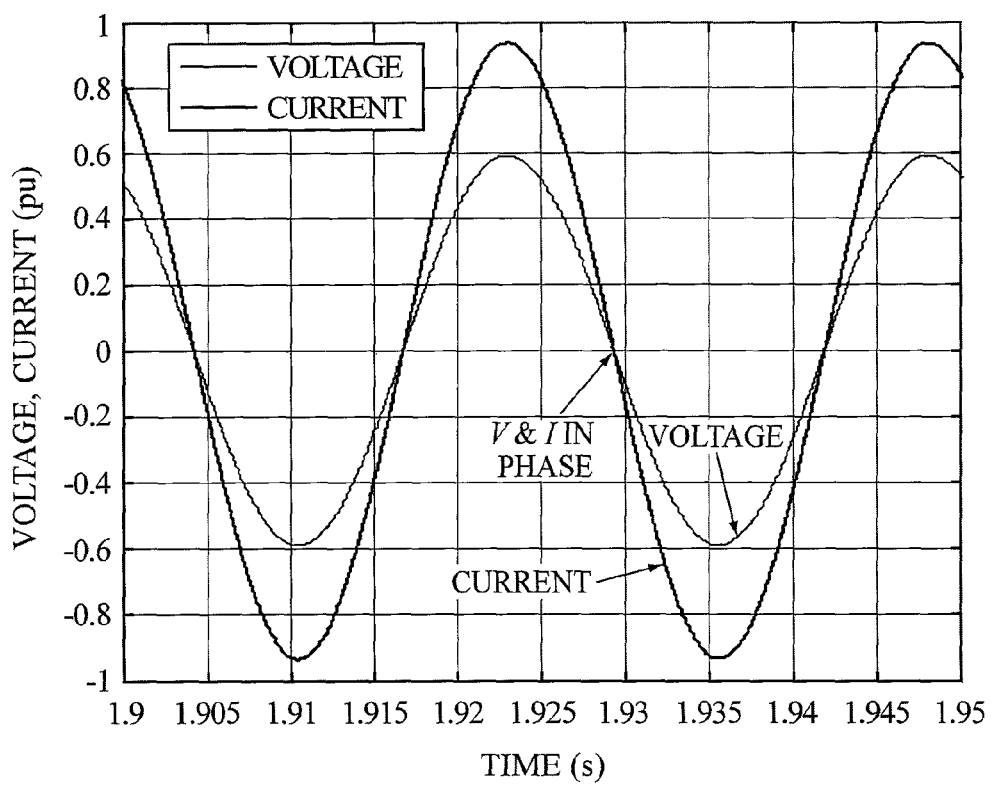
FIG. 17 illustrates the phase relationship between the voltage and current waveforms associated with the unity power factor control method and those from the maximum torque per amp control method at one-half of peak loading.
Figure 17:
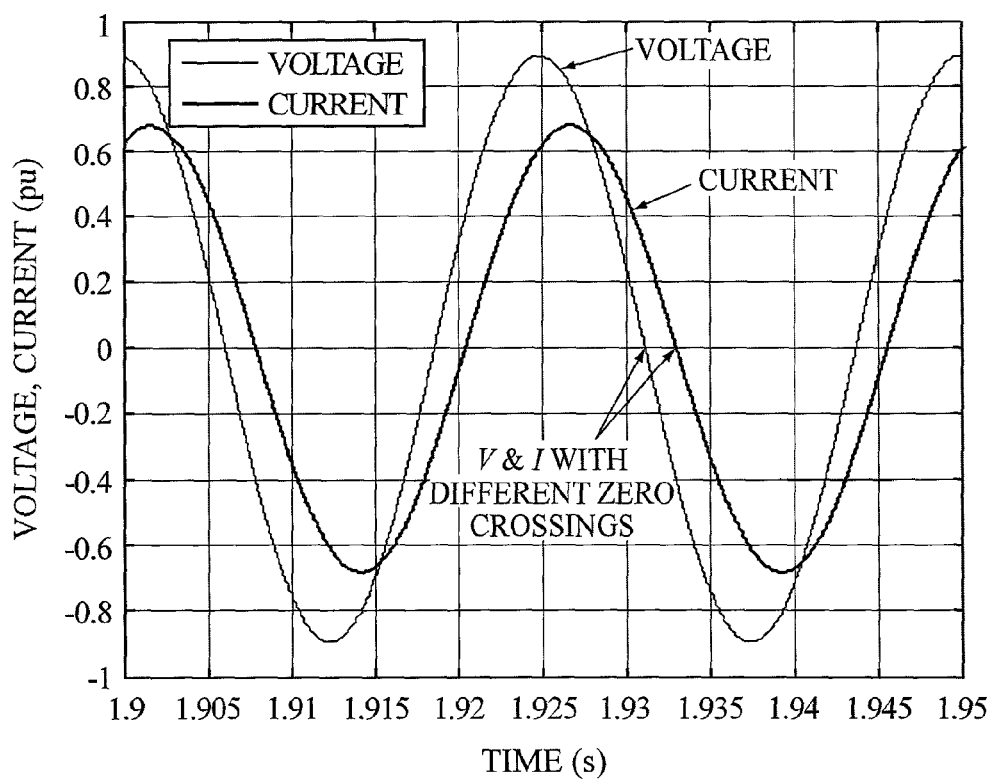
Figure 19:
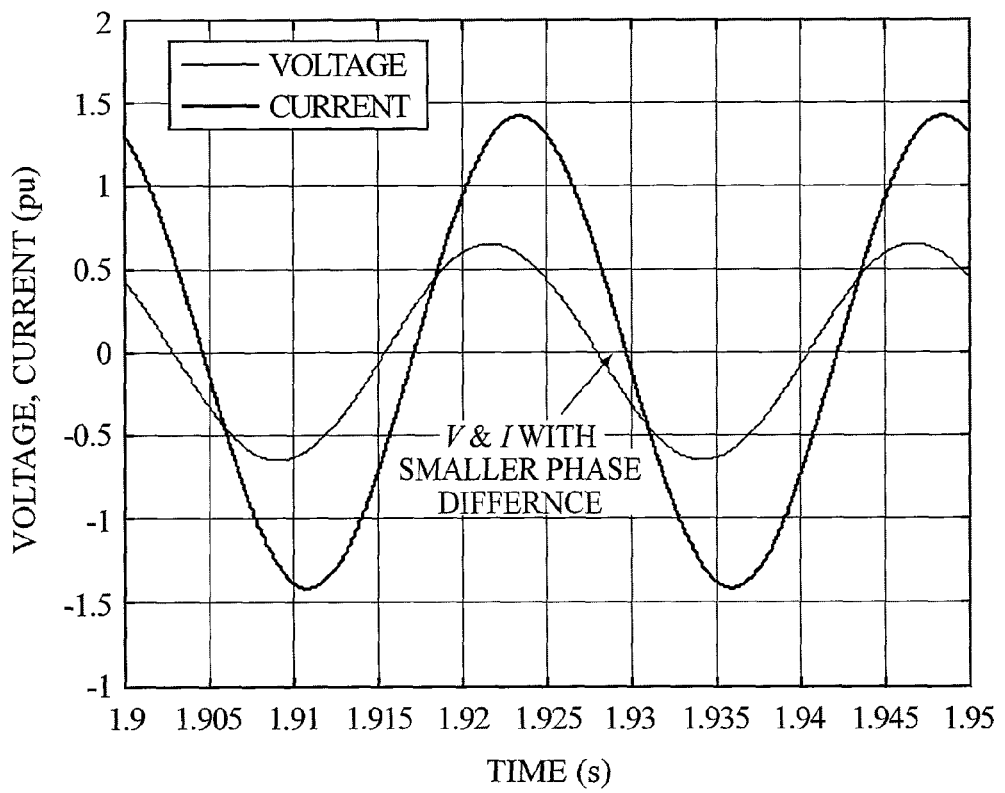
FIG. 19 illustrates the phase relationship between the voltage and current waveforms for a combination of the unity power factor control and maximum power flow control methods with those from the maximum torque per amp control method at three-quarters of peak loading.
Figure 19:
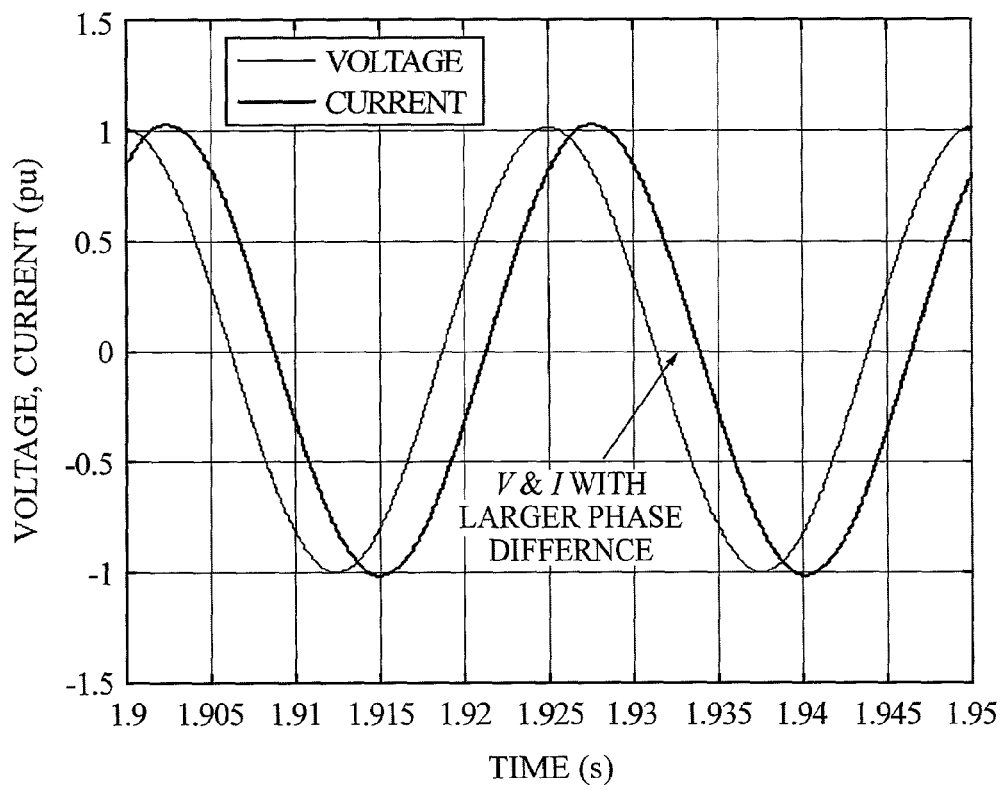

The phase current is lower for the maximum torque per amp control method, but the phase voltage is always higher. The volt-amp product is lowest for the unity power factor control method. The reason for this becomes clear when the voltage and current are shown throughout a couple of cycles for the unity power factor control method and the maximum torque per amp control method in FIG. 15 (one-quarter of peak loading) and FIG. 17 (one-half of peak loading), as well as for the combination of the unity power factor/maximum power flow control methods and maximum torque per amp control in FIG. 19 (three-quarters of peak loading). The waveforms for the unity power factor control method (and combination of the unity power factor control/maximum power flow control methods) are shown at the top of FIGS. 15, 17 and 19 whereas the waveforms for the maximum torque per amp control method are shown at the bottom of FIGS. 15, 17 and 19. The current and voltage are exactly in phase as expected with the unity power factor control method at one-quarter and one-half peak loading (See FIGS. 15 and 17). The maximum torque per amp control method shows a variable phase difference between voltage and current depending on motor loading.

Figure 20:
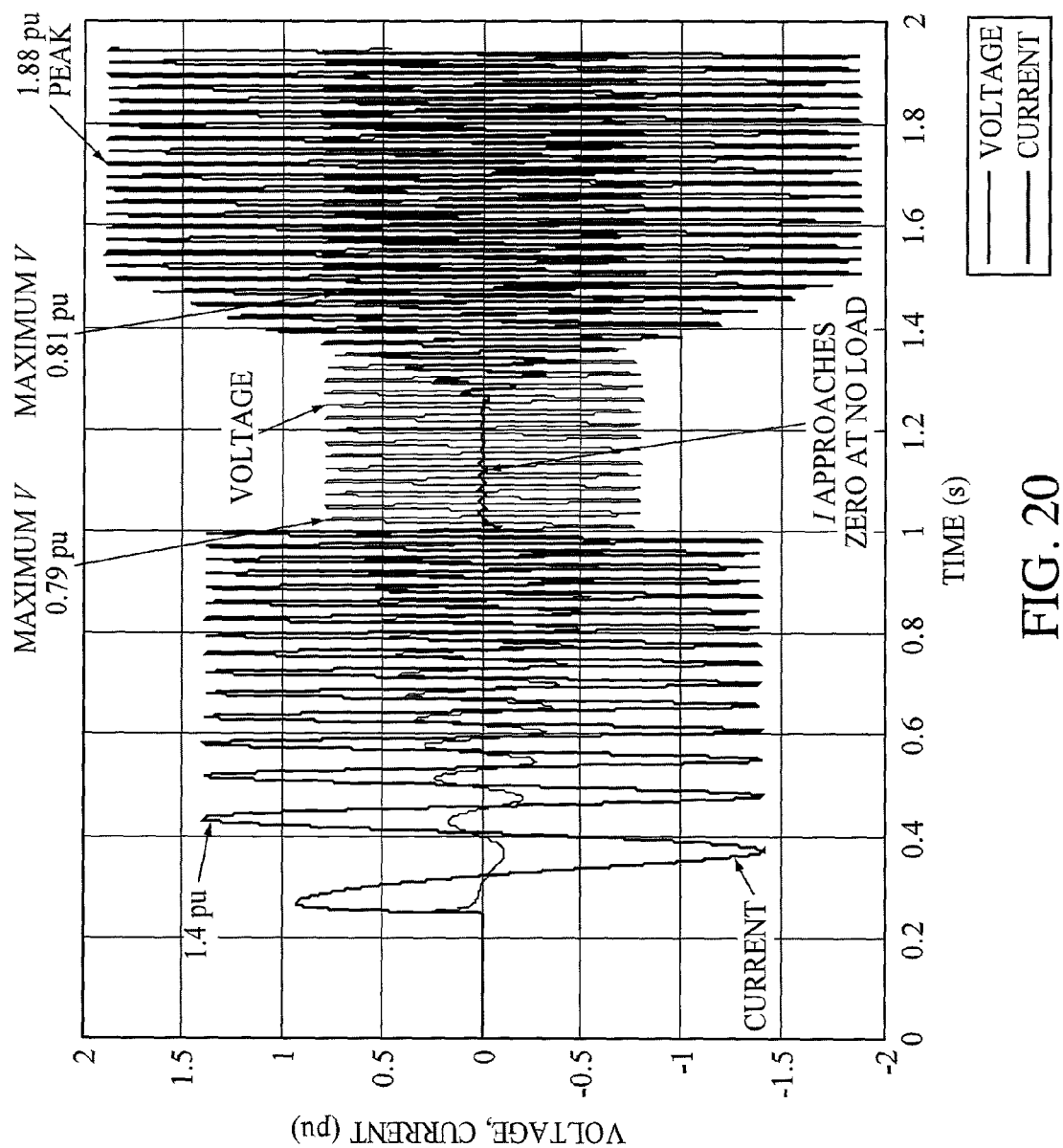
FIG. 20 illustrates simulated current and voltage waveforms for a combination of the unity power factor and maximum power flow control methods.

The same operating scenario illustrated in FIG. 9 was evaluated using the combination of the unity power factor and the maximum power flow control methods. The voltage and current waveforms are shown in FIG. 20. The results can be compared with the maximum torque per amp control method (FIG. 10), the maximum torque per volt control method (FIG. 12) and the constant volts per hertz control method (FIG. 13). The current is higher than the maximum torque per amp control method, but the voltage is lower as expected. The voltage and flux regulation is improved for the unity power factor/maximum power flow control method throughout the load torque ramp at rated speed. The volt-ampere product is lowest for the unity power factor/maximum power flow control method compared with the other methods. The motor shaft torque and power is supplied at high load using the combined unity power factor/maximum power flow control method.

Figure 21:
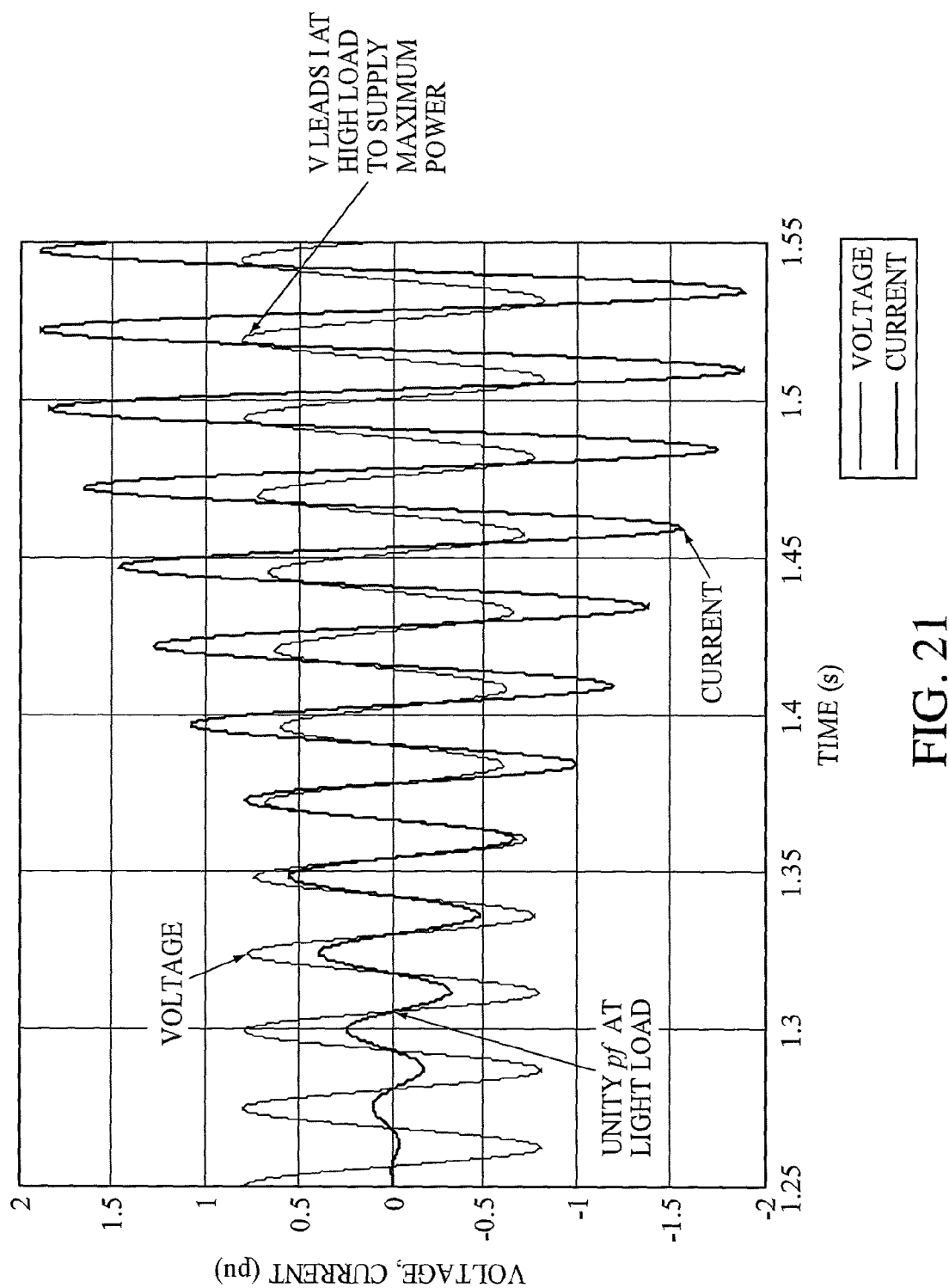
FIG. 21 illustrates the phase relationship between the current and voltage waveforms for a combination of the unity power factor and maximum power flow control methods.

The phase of the current and voltage can be observed during the torque ramp interval at rated speed in FIG. 21. Initially the torque loading is low and the current and voltage are in phase as the unity power factor control method is invoked. The torque loading continues to increase until the voltage and current begin to show a phase shift. Then, at high loading the maximum power flow control method is invoked and a phase shift between voltage and current becomes more evident. The transition from the unity power factor operating mode to the maximum power flow mode is smooth, thereby resulting in a seamless transition from one mode to another.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the described invention. Accordingly, it is understood that the drawings and the descriptions herein are proffered only to facilitate comprehension of the invention and should not be construed to limit the scope thereof.

What is claimed is:

1. A system, comprising:
a processor;
a first module communicably connected to the processor, wherein the first module is configured for calculating:
a q-axis voltage component based on the following equation:

$$v_q = r_s i_q + \omega_r \lambda_{pm} + \omega_r L_d i_d$$

where $r_s$ is a resistance associated with a stator of a motor, $i_q$ is a q-axis current component, $\omega_r$ is a seed of the rotor of the motor, $\lambda_{pm}$ is a stator flux linkage, $L_d$ is a motor stator d-axis inductance and $i_d$ is a d-axis current component; and a d-axis voltage component based on the following equation:

$$v_d = r_s i_d - \omega_r L_q i_q$$

where $r_s$ is a resistance associated with a stator of a motor, $i_d$ is a d-axis current component, $\omega_r$ is a seed of the rotor of the motor, $L_q$ is a motor stator axis inductance and $i_q$ is a q-axis current component;

a second module communicably connected to the processor, wherein the second module is configured for determining a voltage angle relative to the q-axis based on the following equation:

$$\mathrm{Tan}\,\theta = V_d/V_q$$

where $\theta$ is the voltage angle, $V_d$ is a d-axis voltage component and $V_q$ is a q-axis voltage component; and a third module communicably connected to the processor, wherein the third module is configured for:
comparing the determined voltage angle to a predetermined value;
outputting the determined voltage angle if the determined voltage angle is less than the predetermined value; and
outputting the predetermined value if the predetermined value is less than the determined voltage angle.

2. The system of claim 1, further comprising a fourth module communicably connected to the processor, wherein the fourth module is configured to add an additional value to the determined voltage angle.

3. The system of claim 2, wherein the third module is further configured for:
comparing a sum of the determined voltage angle and the additional value to the predetermined value;
outputting the sum of the determined voltage angle and the additional value if the sum is less than the predetermined value; and
outputting the predetermined value if the predetermined value is less than the sum of the determined voltage angle and the additional value.

4. The system of claim 1, further comprising a fifth module communicably connected to the processor, wherein the fifth module is configured for transforming a motor current to:
a q-axis current component; and
a d-axis current component.

5. The system of claim 1, further comprising a sixth module communicably connected to the processor, wherein the sixth module is configured to determine a value for at least one of the following:
a tangent of the determined voltage angle;
a tangent of a sum of the determined voltage angle and an additional value; and
a tangent of the predetermined value.

6. The system of claim 1, further comprising a seventh module communicably connected to the processor, wherein the seventh module is configured to generate a d-axis reference current based on at least one of the following:
a value of a tangent of the determined voltage angle;
a value of a tangent of a sum of the determined voltage angle and an additional value; and
a value of a tangent of the predetermined value.

7. The system of claim 1, further comprising an eighth module communicably connected to the processor, wherein the eighth module is configured to generate a d-axis current error by comparing a d-axis reference current to a d-axis current component.

8. The system of claim 1, further comprising a ninth module communicably connected to the processor, wherein the ninth module is configured to generate a speed error by comparing a speed signal with a reference speed signal.

9. The system of claim 1, further comprising a tenth module communicably connected to the processor, wherein the tenth module is configured to generate a q-axis reference current value based on a speed error.

10. The system of claim 1, further comprising an eleventh module communicably connected to the processor, wherein the eleventh module is configured to generate a q-axis current error by comparing a q-axis reference current to a q-axis current component.

11. The system of claim 1, further comprising a twelfth module communicably connected to the processor, wherein the twelfth module is configured to generate a voltage reference signal based on a q-axis current error and a d-axis current error.

* * * * *